United States Patent
Luo et al.

(10) Patent No.: US 11,507,194 B2
(45) Date of Patent: Nov. 22, 2022

(54) METHODS AND DEVICES FOR HAND-ON-WHEEL GESTURE INTERACTION FOR CONTROLS

(71) Applicants: Wenshu Luo, Toronto (CA); Sachi Mizobuchi, Toronto (CA); Wei Zhou, Richmond Hill (CA); Wei Li, Markham (CA)

(72) Inventors: Wenshu Luo, Toronto (CA); Sachi Mizobuchi, Toronto (CA); Wei Zhou, Richmond Hill (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/109,938

(22) Filed: Dec. 2, 2020

(65) Prior Publication Data

US 2022/0171465 A1     Jun. 2, 2022

(51) Int. Cl.
*G06F 3/01*     (2006.01)
*G06T 7/70*     (2017.01)
(Continued)

(52) U.S. Cl.
CPC .......... *G06F 3/017* (2013.01); *B60R 16/0231* (2013.01); *G06F 3/167* (2013.01);
(Continued)

(58) Field of Classification Search
CPC ........ G06F 3/017; G06F 3/167; G06F 3/0482; G06F 3/04847; B60R 16/0231;
(Continued)

(56) References Cited

U.S. PATENT DOCUMENTS 7,289,645 B2 * 10/2007 Yamamoto .............. G06F 3/017
                                                                382/104
7,782,299 B2 *  8/2010 Ogino ................... G06F 3/0346
                                                                345/158
(Continued)

FOREIGN PATENT DOCUMENTS

CN     111301311 A     6/2020
JP     2005250785 A     9/2005
JP     2013218391 A  * 10/2013

OTHER PUBLICATIONS

Koyama, S., Inami, M., Sugiura, Y., et al. Multi-touch steering wheel for in-car tertiary applications using infrared sensors. Proc. AH '14 2014.

(Continued)

*Primary Examiner* — Grant Sitta

(57) ABSTRACT

Methods, devices, and processor-readable media for hand-on-wheel gesture controls are described. A steering wheel is virtually segmented into a plurality of radial segments. Each segment is assigned a semantic meaning. Control commands related to control functions are mapped to different virtual segments of the steering wheel. When a user performs a gesture on the steering wheel, the system recognizes the gesture and selects a control function based on the location of the hand relative to the steering wheel. In various embodiments, on-wheel hand gestures, on-wheel hand location, and voice commands may be used in various combinations to enable a user to perform a wide selection of functions using a small number of unique commands.

20 Claims, 14 Drawing Sheets

(51) Int. Cl.
  *G06T 7/20* (2017.01)
  *B60R 16/023* (2006.01)
  *G06F 3/16* (2006.01)
  *G06V 20/59* (2022.01)
  *G06V 40/10* (2022.01)
  *G06F 3/04847* (2022.01)
  *G06F 3/0482* (2013.01)

(52) U.S. Cl.
  CPC ............... *G06T 7/20* (2013.01); *G06T 7/70* (2017.01); *G06V 20/597* (2022.01); *G06V 40/107* (2022.01); *G06F 3/0482* (2013.01); *G06F 3/04847* (2013.01); *G06T 2207/10016* (2013.01); *G06T 2207/30196* (2013.01)

(58) Field of Classification Search
  CPC ... G06T 7/20; G06T 7/70; G06T 2207/10016; G06T 2207/30196; G06V 20/597; G06V 40/107
  See application file for complete search history.

(56) References Cited

U.S. PATENT DOCUMENTS

| | | | | |
|---|---|---|---|---|
| 9,248,839 | B1* | 2/2016 | Tan | B60Q 9/00 |
| 9,477,315 | B2* | 10/2016 | Fujimura | G06F 3/017 |
| 9,649,938 | B2* | 5/2017 | Schlittenbauer | G06F 3/017 |
| 9,868,449 | B1* | 1/2018 | Holz | G06V 40/10 |
| 10,144,289 | B2* | 12/2018 | Lee | G06K 9/00845 |
| 10,860,872 | B2* | 12/2020 | Wang | H04N 5/247 |
| 2005/0134117 | A1* | 6/2005 | Ito | G06F 3/017 307/10.1 |
| 2008/0024463 | A1* | 1/2008 | Pryor | B60R 11/0235 345/175 |
| 2012/0150387 | A1* | 6/2012 | Watson | A61B 5/18 701/36 |
| 2013/0063336 | A1* | 3/2013 | Sugimoto | G06F 3/017 345/156 |
| 2013/0076615 | A1* | 3/2013 | Iao | B60K 35/00 345/156 |
| 2013/0249785 | A1* | 9/2013 | Alameh | G06F 3/0304 345/156 |
| 2014/0022070 | A1* | 1/2014 | Golomb | B60Q 1/40 340/475 |
| 2014/0081521 | A1* | 3/2014 | Frojdh | G01C 21/3664 701/36 |
| 2014/0121903 | A1* | 5/2014 | Lee | B60K 37/06 701/41 |
| 2014/0152549 | A1* | 6/2014 | Kim | G06F 3/017 345/156 |
| 2014/0168061 | A1* | 6/2014 | Kim | G06F 3/017 345/156 |
| 2014/0309875 | A1* | 10/2014 | Ricci | G07C 5/02 701/36 |
| 2014/0331185 | A1* | 11/2014 | Carls | G06F 3/04842 715/835 |
| 2015/0294169 | A1* | 10/2015 | Zhou | G06F 3/013 348/148 |
| 2016/0090103 | A1* | 3/2016 | Tan | B60W 50/10 345/156 |
| 2016/0132126 | A1* | 5/2016 | van Laack | G06F 3/04842 345/156 |
| 2016/0171320 | A1* | 6/2016 | Nagata | G06F 3/017 348/78 |
| 2016/0349850 | A1* | 12/2016 | Tsuda | G06F 3/017 |
| 2017/0320501 | A1 | 11/2017 | Li et al. | |
| 2018/0204569 | A1* | 7/2018 | Nadkar | G10L 15/22 |
| 2018/0234496 | A1* | 8/2018 | Ratias | A63F 13/60 |
| 2018/0357040 | A1* | 12/2018 | Spiewla | G06F 3/0488 |
| 2019/0246036 | A1* | 8/2019 | Wu | G06F 21/31 |
| 2019/0385574 | A1* | 12/2019 | Helot | G06F 1/1641 |
| 2020/0110928 | A1* | 4/2020 | Al Jazaery | G06K 9/00335 |

OTHER PUBLICATIONS

Angelini, L., Carrino, F., Carrino, S., et al. Opportunistic Synergy : a Classifier Fusion Engine for Micro-Gesture Recognition. Proc AutomotiveUI'13, 2013.

Pfleging, B., Schneegass, S., and Schmidt, A. Multimodal Interaction in the Car—Combining Speech and Gestures on the Steering Wheel. Proc AutomotiveUI'12 2012.

Enders, C., Schwartz, T., and Muller, C. "Geremin": 2D Microgestures for Drivers Based on Electric Field Sensing. IUI 11. Feb. 13-16, 2011.

* cited by examiner

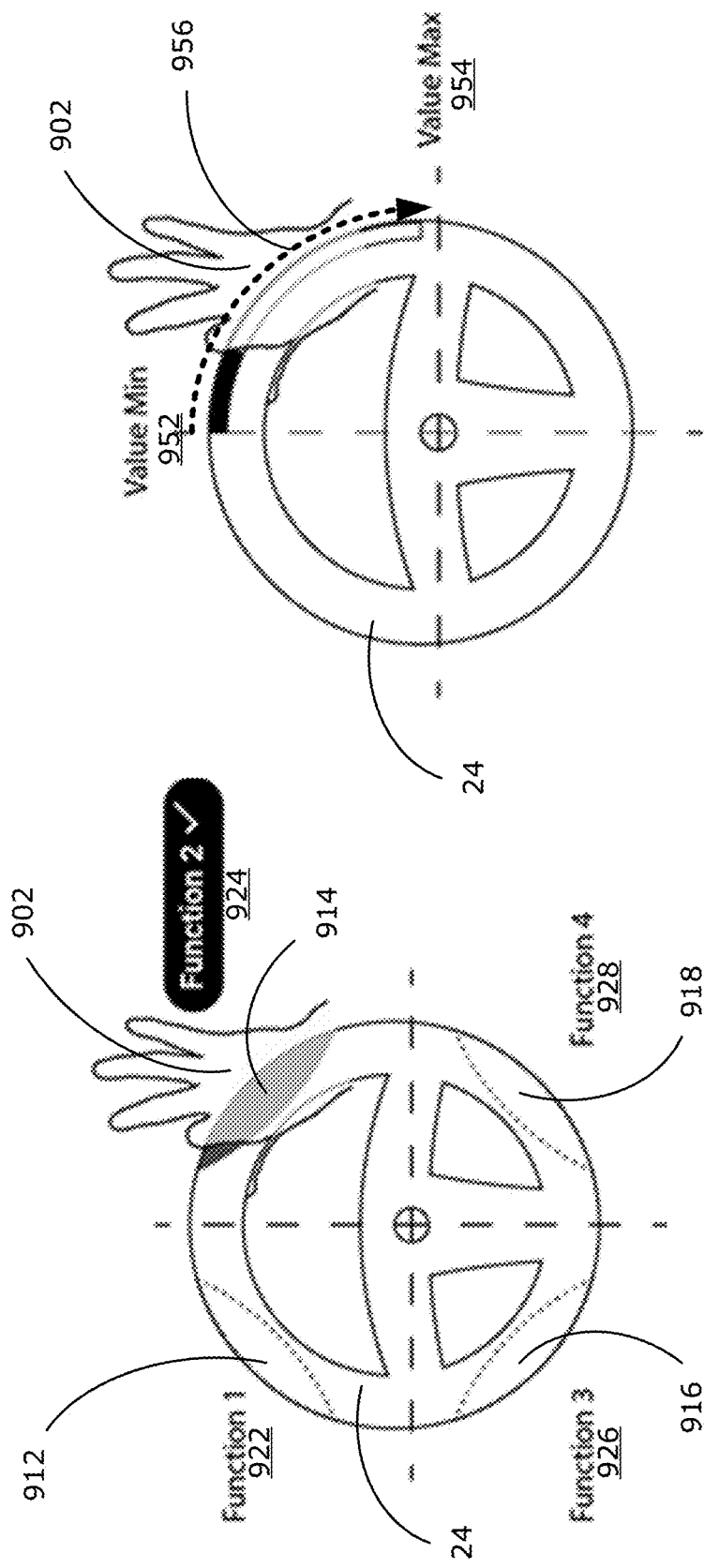

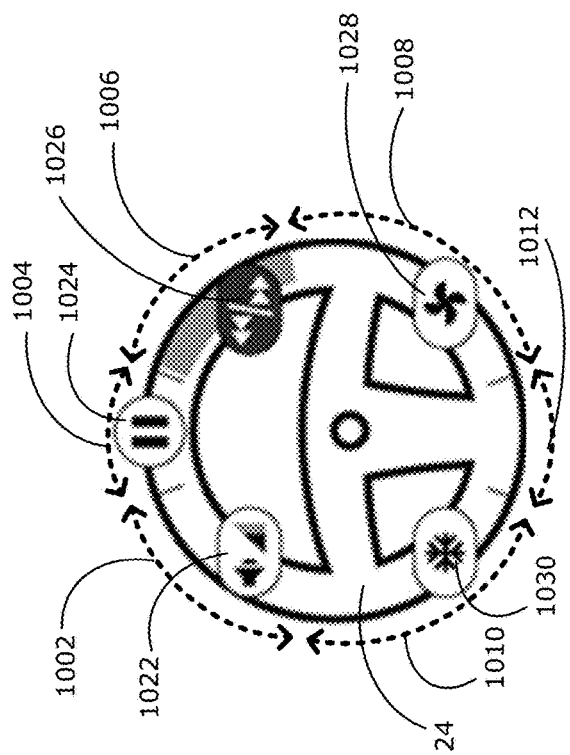
FIG. 10A
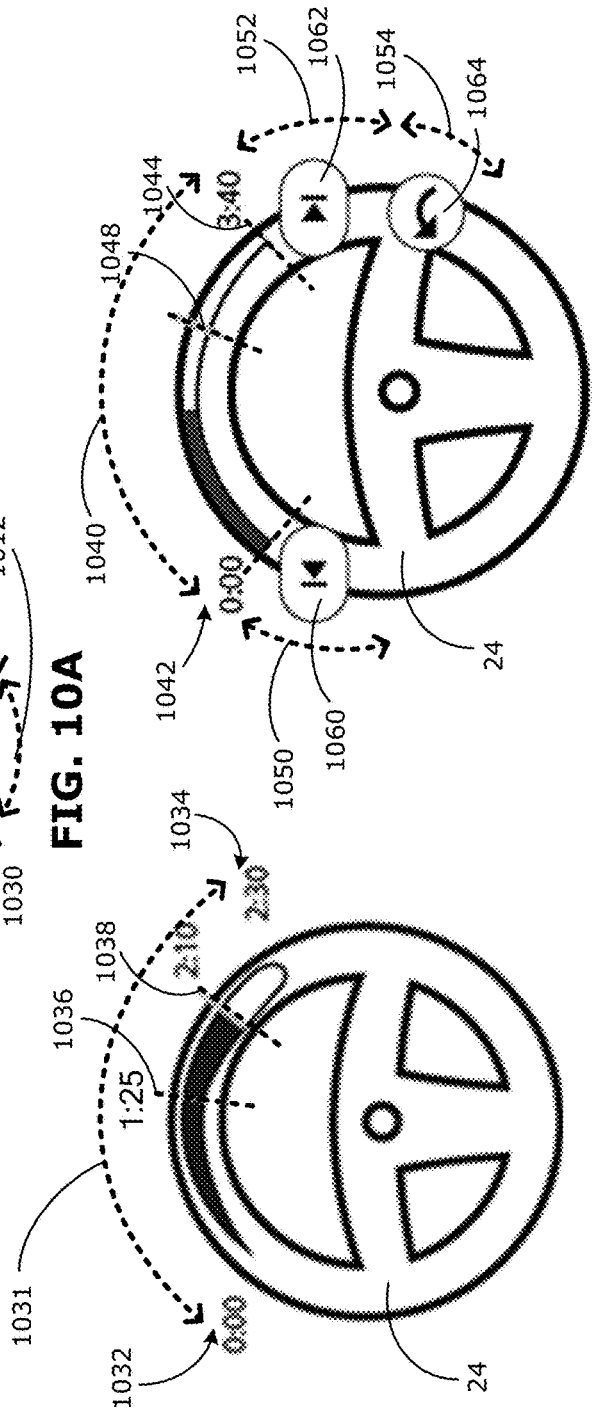
FIG. 10C
FIG. 10B

METHODS AND DEVICES FOR HAND-ON-WHEEL GESTURE INTERACTION FOR CONTROLS

RELATED APPLICATION DATA

This is the first patent application related to this matter.

FIELD

The present application generally relates to methods and devices for computer vision, and in particular to methods and devices for hand-on-wheel gestures for device controls, for example in-vehicle controls.

BACKGROUND

In-vehicle control designs in the past were heavily reliant on physical buttons and knobs, which might cause safety issues while driving and affect drivers' driving experience: for example, the driver might take a hand off the wheel to adjust a knob or button, repeatedly switch his or her gaze off the road to check knob or button position, repeatedly make difficult precise adjustments, etc.

To improve driving safety and the driving experience, various approaches have been taken to improving in-vehicle controls.

In recent years, touch screen interaction has been adopted by vehicle manufacturers to replace traditional buttons and knobs. While touchscreen interfaces may present a more elegant appearance, the fundamental issues affecting safety and driving experience remain. Drivers still need to take their hands off the wheel and repeatedly switch their gaze to locate where they should touch. In some cases, touchscreen interactions may require more attention than using buttons or knobs.

Another recent approach is gesture control of in-vehicle systems. Many modern electronic devices, such as televisions and large display screens, enable a user to interact with (i.e., to control and provide data to) such electronic devices using gestures performed in a space in front of, or otherwise in proximity to, the electronic device. These gestures can be captured in a field of view (FOV) of a camera of the electronic device or a camera connected to the electronic device. Such gestures are referred to as mid-air gestures. For example, mid-air gestures may be used by a user to control digital content rendered on a display screen of the electronic device.

With gesture control of in-vehicle systems, such as vehicle infotainment or communication systems, there is no need to look for buttons. However, many existing gesture-based approaches require drivers to memorize a variety of gestures, some of which do not have strong or intuitive associations with the functions they are associated with. More importantly, drivers often have trouble determining where the gesture should be performed, which causes frustration and further distracts them from driving. Furthermore, the driver may have limited ability to move his or her hands to perform in-air hand gestures while holding the steering wheel.

There thus exists a need for in-vehicle gesture-based controls that overcome one or more of the disadvantages of existing approaches identified above.

SUMMARY

The present disclosure describes methods and devices for hand-on-wheel gestures for device controls, for example in-vehicle controls. In some embodiments, a steering wheel of a vehicle is virtually segmented into a plurality of sections or regions, such as portions of the perimeter of the steering wheel. Each virtual segment or region is assigned a semantic meaning. In-vehicle control commands related to in-vehicle control functions, such as audio volume adjustment of an audio-visual (A/V) system or temperature adjustment of a heating/ventilation/air conditioning (HVAC) system, are mapped to different virtual segments of the steering wheel. When a driver of the vehicle performs a gesture on the steering wheel, a gesture-controlled device recognizes and classifies the gesture and selects an in-vehicle control function based on the location of the hand relative to the steering wheel.

In various embodiments, on-wheel hand gestures, on-wheel hand location, and voice commands may be used in various combinations to enable a driver to first specify an in-vehicle control function, then use the in-vehicle control function to adjust a value of a setting used by a gesture-controlled device, such as audio volume or temperature as described above. Thus, in some embodiments a hierarchical menu (e.g., access controls>select setting>adjust setting value) may be navigated using a sequence or combination of voice commands and hand movements.

As used herein, the terms "perimeter" and "circumference" may be used interchangeably to refer to the perimeter of a steering wheel. In the case of a non-round steering wheel, the perimeter of the steering wheel may be treated analogously to a circumference with respect to such concepts as an arc or radial segment along the perimeter, or traversing the perimeter in a clockwise or counter-clockwise direction.

As used herein, the term "setting" refers to a variable or configuration parameter used by a gesture-controlled device. A setting may be represented as a value or set of values stored in the memory of the device. Settings may be used by the device or by one or more vehicle systems to determine operational parameters, and may include audio volume, audiovisual content playback position, HVAC temperature, HVAC fan speed, and so on. Some settings are represented by a value capable of having a continuous range of values, whereas other settings have values selected from a set of discrete values.

As used herein, a "command" is a signifier mapped to a specific function within a particular context. Commands may include voice commands (such as words or phrases) or gesture commands that, when recognized and classified by a gesture-controlled device, are interpreted within the present context to cause a function to be executed.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

As used herein, the term "frame" refers to a video frame, for example a two-dimensional digital image captured by a digital camera as part of a temporal sequence of such captured images.

In some aspects, the present disclosure describes a method for controlling a gesture-controlled device based on hand gestures, the method comprising: processing a video frame to determine: a location of a steering wheel in the frame, and a location of a hand relative to the steering wheel in the frame, and executing a function of the gesture-controlled device, the function being selected from a plurality of functions based on the location of the hand relative to the steering wheel in the frame.

In some aspects, the present disclosure describes a gesture-controlled device controlled by hand gestures. The gesture-controlled device comprises a processor device and a memory. The memory stores machine-executable instructions thereon which, when executed by the processing device, cause the system to process a video frame to determine a location of a steering wheel in the frame and a location of a hand relative to the steering wheel in the frame, and execute a function of the gesture-controlled device, the function being selected from a plurality of functions based on the location of the hand relative to the steering wheel in the frame.

In some examples, the method further comprises recognizing a first hand gesture being performed by the hand in the frame, wherein the function is selected based on the location of the hand relative to the steering wheel and the first hand gesture.

In some examples, determining a location of a hand relative to the steering wheel comprises determining that the location of the hand is within a first region of the steering wheel.

In some examples, the region comprises a portion of a circumference of the steering wheel.

In some examples, the method comprises determining a movement of the hand relative to the steering wheel based on the location of the hand relative to the steering wheel in the frame and a location of the hand relative to the steering wheel in one or more previous video frames. The function changes a value of a first setting used by the gesture-controlled device, and the magnitude of change of the value by the function is based on a magnitude of the movement.

In some examples, the value may be changed in at least two directions, and the direction of the change of the value by the function is based on a direction of the movement.

In some examples, the direction and magnitude of the movement are determined based on a starting location of the hand at a first location on the perimeter of the steering wheel in at least one of the previous frames, and a current location of the hand at a second location on the perimeter of the steering wheel in the frame.

In some examples, the method further comprises, prior to processing the video frame, processing at least one previous video frame to recognize a wake-up hand gesture being performed by the hand in the at least one previous frame.

In some examples, the method further comprises, prior to processing the video frame, processing audio data to detect a wake-up voice command.

In some examples, determining the location of the hand relative to the steering wheel comprises identifying a left hand and a right hand in the frame, selecting the left hand or right hand as the hand used for gesture control based on the value of a primary hand setting, and determining the location of the hand used for gesture control relative to the steering wheel.

In some examples, the method further comprises, prior to executing the function, selecting the first setting from a plurality of settings based on the location of the hand relative to the steering wheel in a further at least one previous video frame corresponding to a time prior to the one or more previous video frames.

In some examples, the method further comprises, prior to processing the video frame, processing at least one previous video frame to recognize a wake-up hand gesture being performed by the hand in the at least one previous frame, and in response to recognizing the wake-up hand gesture, displaying visual feedback indicating a plurality of functions corresponding to a plurality of portions of the circumference of the steering wheel.

In some examples, the function changes a value of a first setting used by the gesture-controlled device, and determining a location of a hand relative to the steering wheel comprises determining that the location of the hand is within a portion of a circumference of the steering wheel.

In some examples, the method further comprises, prior to processing the video frame, processing at least one previous video frame to recognize a wake-up hand gesture being performed by the hand in the at least one previous frame, processing audio data to detect a function select voice command, and selecting the first setting from a plurality of settings based on the function select voice command.

In some examples, the method further comprises recognizing a first hand gesture being performed by the hand in the frame, the first hand gesture corresponding to a first setting of a plurality of settings used by the gesture-controlled device, determining that the hand has been performing the first hand gesture in one or more previous frames, and determining a magnitude of a movement of the hand relative to the steering wheel based on a starting location of the hand at a first location on the perimeter of the steering wheel in at least one of the previous frames, and a current location of the hand at a second location on the perimeter of the steering wheel in the frame. The function changes a value of the first setting, and the magnitude of change of the value by the function is based on a magnitude of the movement.

In some examples, the method further comprises processing at least one previous video frame to recognize a wake-up hand gesture being performed by the hand in the at least one previous frame, processing audio data to detect a function select voice command, and selecting the first setting from a plurality of settings based on the function select voice command.

In some examples, the gesture-controlled device further comprises a camera for capturing the video frame.

In some examples, the gesture-controlled device further comprises a display. The instructions, when executed by the processing device, further cause the system to, prior to processing the video frame, process at least one previous video frame to recognize a wake-up hand gesture being performed by the hand in the at least one previous frame, and in response to recognizing the wake-up hand gesture, present visual feedback on the display indicating a plurality of functions corresponding to a plurality of portions of a circumference of the steering wheel.

In some aspects, the present disclosure describes a non-transitory processor-readable medium having machine-executable instructions stored thereon which, when executed by a processor device, cause the processor device to process a video frame to determine a location of a steering wheel in the frame and a location of a hand relative to the steering wheel in the frame, and execute a function of a gesture-controlled device, the function being selected from a plurality of functions based on the location of the hand relative to the steering wheel in the frame.

In some aspects, the present disclosure describes a non-transitory processor-readable medium having instructions tangibly stored thereon. The instructions, when executed by a processor device, cause the processor device to perform the method steps described above.

The examples disclosed herein may provide various advantages. First, by using the steering wheel as a reference, the driver has a tangible reference to determine where to perform the gestures and how far to move his or her hand to perform precise gestures involving hand movement, such as setting value adjustments. The tangible feel and physical support of the steering wheel may make the performance of the hand gesture more physically comfortable and lead to less hand and arm strain. In addition, being able to access control functions nested in a hierarchy may simplify the number of options confronting the driver at any time, thereby minimizing the number of gestures or voice commands that must be learned and differentiated. Furthermore, the driver is not required take one hand off the steering wheel to reach buttons, knobs, or touchscreens when interacting with an in-car control system, nor is the driver required to direct his or her gaze away from the road to look at the button, knob, or touchscreen. Example embodiments described herein may therefore result in improved safety, ease of use, and driver comfort.

BRIEF DESCRIPTION OF THE DRAWINGS

Reference will now be made, by way of example, to the accompanying drawings which show example embodiments of the present application, and in which:

FIG. 9A illustrates an example virtual segmentation of a steering wheel into regions around its perimeter corresponding to different control functions, according to examples described herein;

FIG. 9B illustrates an example virtual segmentation of a steering wheel showing an arc around its perimeter corresponding to a range of values for a setting used by a gesture-controlled device, according to examples described herein;

FIG. 10A illustrates an example virtual segmentation of a steering wheel into regions around its perimeter corresponding to control functions for adjusting audio volume, pausing playback of audiovisual content, navigating audiovisual content playback, adjusting HVAC fan speed, and adjusting HVAC temperature, according to examples described herein;

FIG. 10B illustrates an example virtual segmentation of a steering wheel showing an arc around its perimeter used to select from a range of values for an audiovisual content playback position setting used by a gesture-controlled device, according to examples described herein;

FIG. 10C illustrates an example virtual segmentation of a steering wheel into virtual segments corresponding to an audiovisual content playback navigate backward function, an audiovisual content playback navigate forward function, an exit function, and showing an arc around its perimeter displaying a range of values for an audiovisual content playback navigation setting used by a gesture-controlled device, according to examples described herein;

Similar reference numerals may have been used in different figures to denote similar components.

DESCRIPTION OF EXAMPLE EMBODIMENTS

The present disclosure describes methods and devices for hand-on-wheel gestures for in-vehicle controls. In some embodiments, a steering wheel of a vehicle is virtually segmented into a plurality of sections or regions, such as portions of the perimeter of the steering wheel. Each virtual segment or region is assigned a semantic meaning. In-vehicle control commands related to in-vehicle control functions, such as audio volume adjustment of an audio-visual (A/V) system or temperature adjustment of a heating/ventilation/air conditioning (HVAC) system, are mapped to different virtual segments of the steering wheel. When a driver of the vehicle performs a gesture on the steering wheel, the gesture-controlled device recognizes the gesture and selects an in-vehicle control function based on the location of the hand relative to the steering wheel. In some embodiments, moving a hand along a portion of the circumference or perimeter of the steering wheel may adjust the value of a setting used by the gesture-controlled device, either along a range of continuous values or among a set of discrete values. In some embodiments, voice commands may also be used in combination with hand-on-wheel gestures to navigate a hierarchy of functions.

In various embodiments, on-wheel hand gestures, on-wheel hand movement, and voice commands may be used in various combinations to enable a driver to first specify an in-vehicle control function, then use the in-vehicle control function to adjust a value of a setting used by a gesture-controlled device, such as audio volume or temperature as described above. Thus, in some embodiments a hierarchical menu (e.g., access controls>select setting>adjust setting value) may be navigated using a sequence or combination of voice commands and hand movements.

Example Gesture-Controlled Devices

For simplicity, the present disclosure describes examples in the context of a gesture-controlled device in a vehicle, and describes methods and systems for controlling the device to effect functions relating to an A/V system (e.g., adjusting audio volume, starting or stopping playback, navigating playback position), an HVAC system (e.g., adjusting fan speed, adjusting temperature), or other vehicle systems (e.g., adjusting windows, door locks, or mirrors). However, it should be understood that the present disclosure is not limited to such embodiments, and the methods and gesture-controlled devices described herein may be used for controlling of a variety of gesture-controlled devices in a variety of applications.

Figure 1:
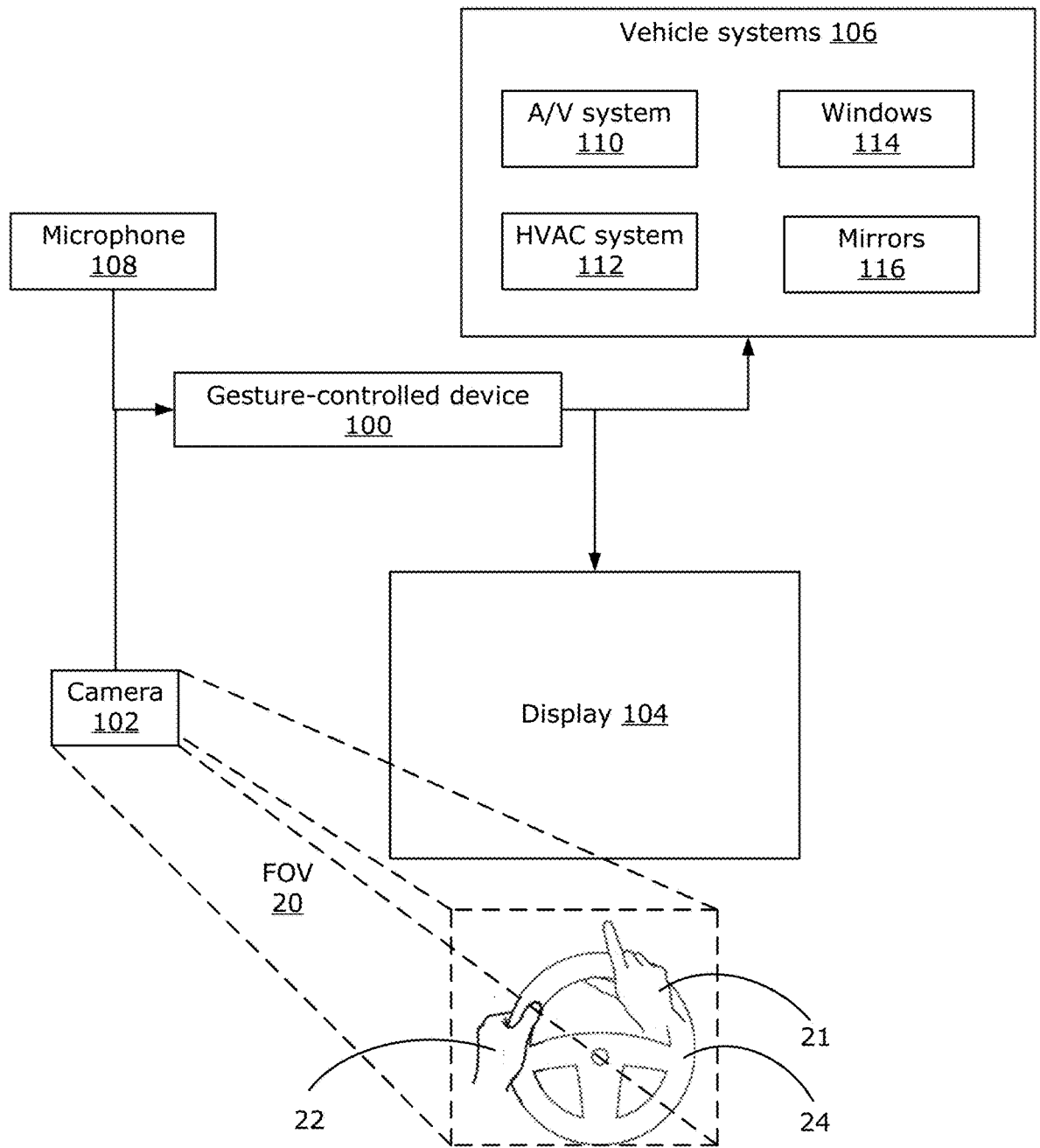
FIG. 1 is a block diagram illustrating a driver interacting with an example gesture-controlled device in a vehicle.

FIG. 1 shows an example of a driver using his or her hands on a steering wheel 24 to interact with a gesture-controlled device 100. In this simplified diagram, the gesture-controlled device 100 includes or communicates with a digital camera 102 that captures a field-of-view (FOV) 20. In some embodiments, the camera 102 may be positioned above and behind the driver's shoulder, and toward the outside of the vehicle relative to the driver (e.g., above, behind, and to the left of the driver in a North American car model), thereby enabling a FOV 20 that faces the steering wheel as close to straight-on (i.e., similar to the driver's view) as possible. The FOV 20 may thus include at least a portion of the steering wheel 24 as well as the user's hands thereon. In this example, the driver's left hand 22 is holding the steering wheel 24, whereas the driver's right hand 21 is performing a hand-on-wheel gesture. The gesture-controlled device 100 may include a primary hand configuration setting that identifies the left hand 22 or right hand 21 as the primary hand; in this example, the primary hand configuration setting identifies the right hand 21 as the primary hand, resulting in the left hand being ignored by the gesture-recognition and hand-tracking subsystems described below when the left hand and right hand are both visible in the FOV 20. For the sake of simplicity and visibility, the drawings herein show only a right hand on the steering wheel, and the right hand is assumed to be the primary hand. However, it will be appreciated that the example steering wheel views illustrated herein would typically also show a left hand holding the steering wheel while the right (i.e. primary) hand is performing hand-on-wheel gestures. It will also be appreciated that whereas the right hand may be used as a default primary hand setting for right-hand-operated vehicles (e.g., North American car models), the left hand may be used as a default primary hand setting for left-hand-operated vehicles (e.g., United Kingdom car models).

In some embodiments the gesture-controlled device 100 may, instead of or in addition to the digital camera 102, have another sensor capable of sensing hand gestures from the user 10, for example any image capturing device/sensor (e.g., an infrared image sensor).

The gesture-controlled device 100 may include or communicate with a display device 104 (hereinafter referred to as display 104) for rendering visual information thereon. The display 104 may be positioned such that the driver can view the display without averting his or her gaze from the road, or by only minimally deflecting the angle of his or her gaze from the road. For example, the display 104 may constitute a heads-up display (HUD) projected onto the front windshield of the vehicle, or it may be located near or above the top of the driver-side dashboard. In some embodiments, the display 104 may be used to present visual feedback to the driver, as described in detail below.

The gesture-controlled device 100 may include or communicate with a microphone 108 for capturing sound from the interior of the vehicle and converting the sound into audio data to enable the gesture-controlled device 100 to detect and respond to voice commands by the driver (or another person inside the vehicle), as described in detail below.

The gesture-controlled device 100 may communicate with and control one or more additional vehicle systems 106 such as an A/V system 110, an HVAC system 112, vehicle windows 114, vehicle mirrors 116, and potentially others, such as door locks. The A/V system 110 may include a number of individual sub-components (e.g., speakers, displays, wired and wireless data interfaces) that may be independently controlled in some embodiments. Examples described herein will relate primarily to A/V system 110 and HVAC system 112 control functions, but it will be appreciated that the embodiments described herein are not limited to control of any particular vehicle system or subset of vehicle systems. For example, the methods and systems described herein could be used to control an in-vehicle communication system or a global positioning system (GPS) based navigation system.

Figure 2:
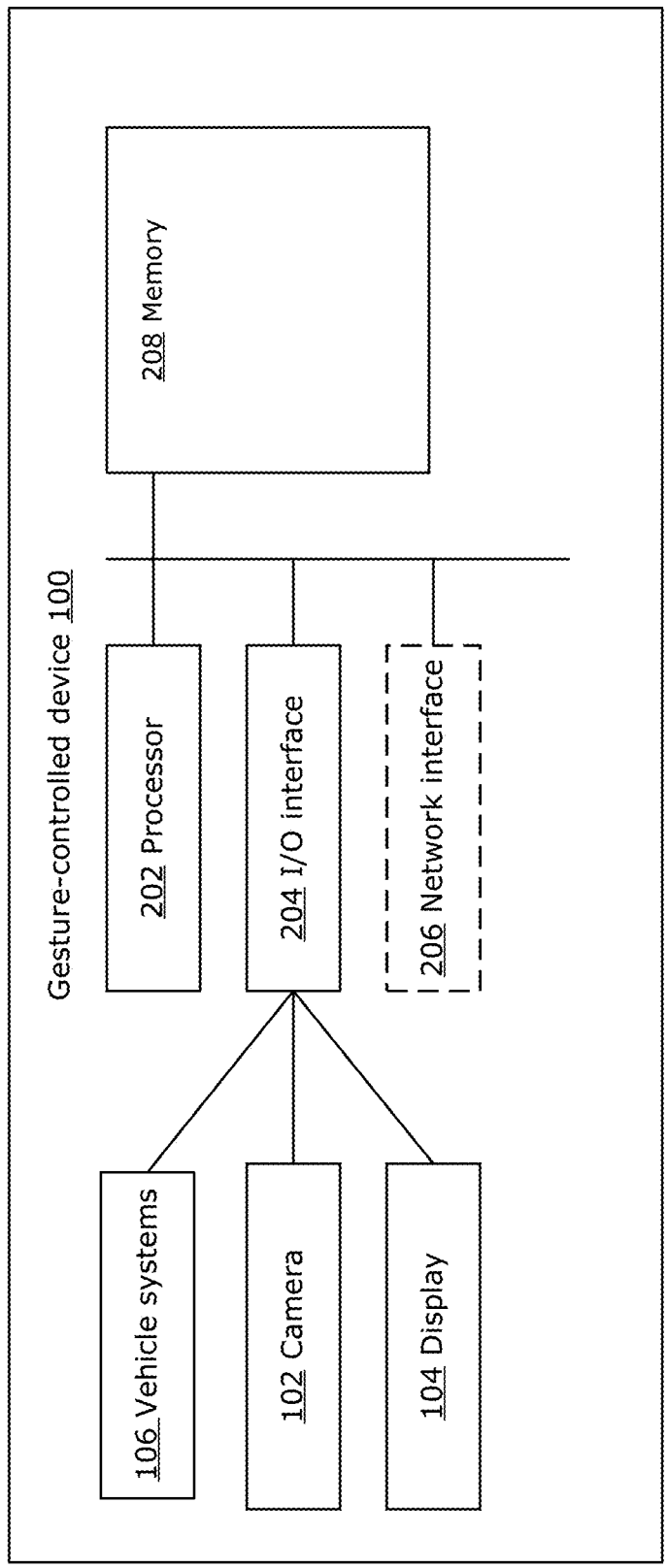
FIG. 2 is a block diagram illustrating some components of an example gesture-controlled device.

FIG. 2 shows a block diagram of the gesture-controlled device 100. Although an example embodiment of the gesture-controlled device 100 is shown and discussed below, other embodiments may be used to implement examples disclosed herein, which may include components different from those shown. Although FIG. 2 shows a single instance of each component of the gesture-controlled device 100, there may be multiple instances of each component shown.

The gesture-controlled device 100 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device". The gesture-controlled device 100 also includes one or more input/output (I/O) interfaces 204, which interfaces input devices such as the digital camera 102 and microphone 108, and output devices such as the display 104 and other vehicle systems 106. The gesture-controlled device 100 may include other input devices (e.g., buttons, knobs, touchscreen, etc.) and other output devices (e.g., a diagnostic port enabling data input and output). The digital camera 102 (or other input device, such as an infrared camera) may have capabilities for capturing live gesture input as a sequence of video frames. The captured frames may be buffered by the I/O interface(s) 204 and provided to the processing device(s) 202 to be processed in real-time or near real-time (e.g., within 100 ms).

The gesture-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processor(s) 202, such as to carry out examples described in the present disclosure. The memory(ies) 208 may include other software instructions, such as for implementing an operating system and other applications/functions.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with each other via a bus, for example.

In some embodiments, a distributed system may include multiple gesture-controlled devices 100 as well as optionally one or more additional components. The distributed system may include multiple gesture-controlled devices 100 in communication with each other over a network; for example, an in-vehicle device may communicate over a network with a remote server or cloud computing platform which performs the hand-tracking, gesture-recognition, and/or voice command recognition methods described herein and provides the output of those methods to the in-vehicle device. Thus, hand-tracking, gesture-recognition, and/or voice command recognition may be carried out through some combination of local processing (i.e. at the in-vehicle gesture controlled device 100) and remote or central processing (i.e. at a central server).

In some embodiments, multiple digital cameras 102 may be used to capture the driver's gestures. In such an example multi-camera embodiment, the methods, devices and systems described herein could be used to detect, track, and recognize the driver's hand-on-wheel gestures by combining the video frames captured by each digital camera. This combination of frames from multiple digital cameras could be accomplished temporally in some embodiments (e.g. processing each frame for gesture recognition sequentially), spatially in some embodiments (e.g. creating a composite video frame encompassing the current frame from each digital camera, and processing the composite frame for gesture recognition), or by some other method of combining video frame inputs from multiple digital cameras.

Example Gestures

To help in understanding the present disclosure, a discussion of gestures is first provided. In the present disclosure, a hand gesture is generally defined as a distinct hand shape that may be recognized by the gesture-controlled device 100 as a particular command. A hand gesture may have different shapes and movement. For example, hand gestures may be recognized by the gesture-controlled device 100 as belonging to one of the classes shown in FIGS. 3A and 3B.

Figure 3A:
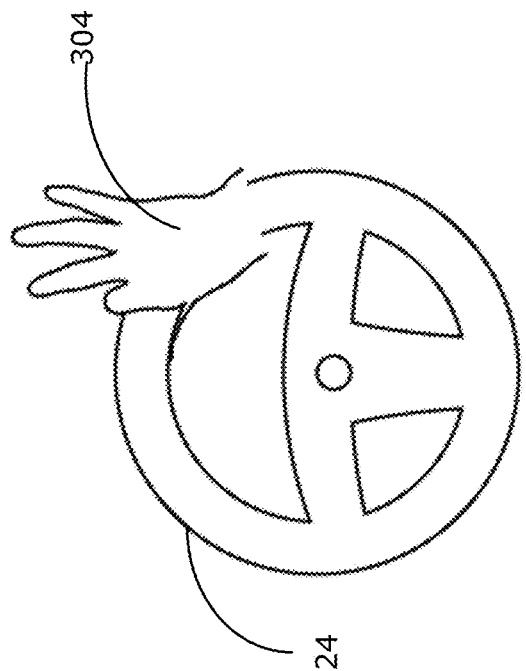
FIG. 3A illustrates an example "L-shape" static gesture that may be detected and classified by an example gesture-controlled device.
Figure 3B:
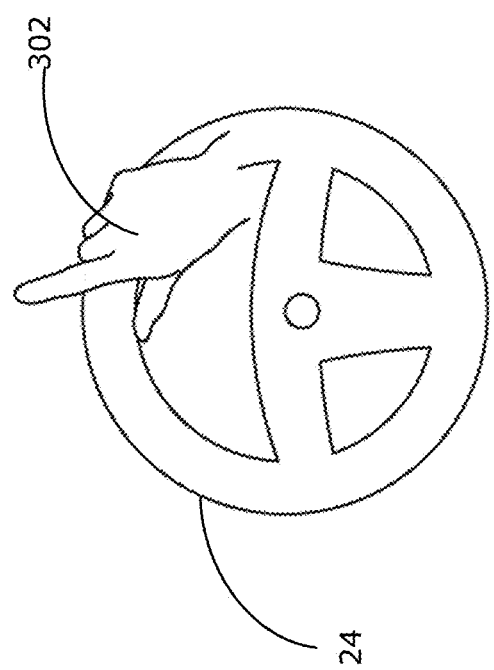
FIG. 3B illustrates an example "encircle" static gesture that may be detected and classified by an example gesture-controlled device.

FIG. 3A illustrates an "L-shape" gesture 302 performed by the right hand, in which the index finger and thumb are extended at an obtuse angle to each other, while the other fingers are curled in toward the palm. FIG. 3B illustrates an "encircle" gesture 304, in which the thumb and index finger encircle the steering wheel 24 while the other fingers are extended outward. Other gesture classes may be recognized by the gesture-controlled device 100.

The gestures shown in FIGS. 3A and 3B are performed with the driver's hand in a particular relation to the steering wheel 24. In particular, the "L-shape" gesture 302 is performed with hand resting on the steering wheel 24 and the thumb and forefinger defining a plane roughly coplanar with the front (i.e. driver-facing) surface of the steering wheel, and the "encircle" gesture 304 is performed with the thumb and forefinger encircling the steering wheel 24 at a point about its circumference or perimeter. By using the steering wheel 24 as a physical reference, the driver is guided to perform the gestures in a specific location and orientation, thereby improving the accuracy of the hand-tracking and gesture-classification system described below.

Based on such gesture classes, hand gestures may be categorized into static or dynamic gestures. A static gesture is defined by a single gesture class, and is held in a generally fixed location (e.g., within a defined area relative to the steering wheel that allows for some margin of error) for at least a defined period of time (e.g., 1 second) or at least a defined number of consecutive captured video frames (e.g., 100 frames). For example, the static "L-shape" gesture 302 may be recognized by the gesture-controlled device 100, and may be interpreted as a "wake up" command, as described in detail below. The static "encircle" gesture 304 may be recognized by the gesture-controlled device 100, and in the context of a device in an awake state may be interpreted as a "select function" command that selects a function of the gesture-controlled device from a plurality of available functions based on the location about the perimeter of the steering wheel where the "encircle" gesture 304 is performed, as described below.

A dynamic gesture is defined by a combination of one or more gesture classes, locations, and/or movements. For example, a dynamic gesture may be a single gesture class that changes in location over time (e.g., detected at different locations over a captured sequence of video frames). The "L-shape" gesture 302 that changes in location may be recognized by the gesture-controlled device 100, and may be interpreted as a command to change the value of a setting used by the gesture-controlled device 100 that corresponds to the "L-shape" gesture 100, as described below.

Figure 4A:
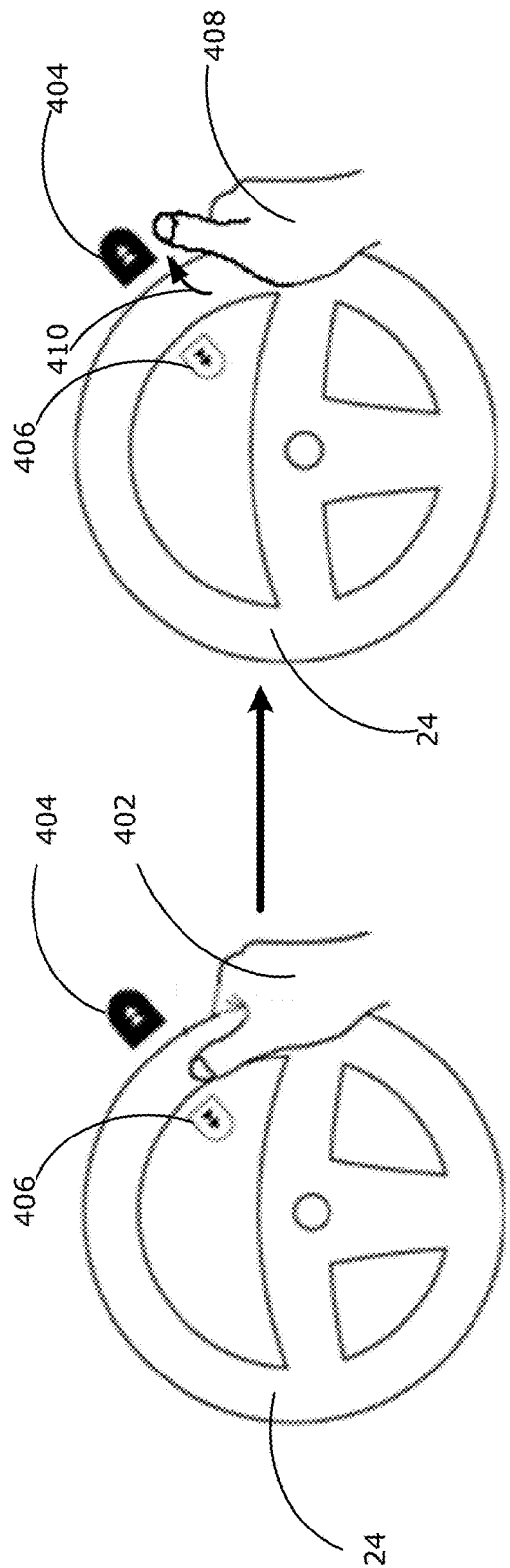
FIG. 4A illustrates an example "thumb-flick" dynamic gesture that may be detected and classified by an example gesture-controlled device.

FIG. 4A illustrates another type of dynamic gesture which may be a combination of gesture classes. In FIG. 4A, the dynamic gesture includes a combination of a "neutral" gesture 402, in which the hand grasps the steering wheel in a neutral position, followed by a "thumb flick outward" gesture 408 in which the thumb is extended away from the center of the steering wheel relative to its position in the "neutral" gesture 402, as indicated by the thumb movement arrow 410. This dynamic gesture may be recognized by the gesture-controlled device 100 and interpreted as a command to navigate forward within A/V content playback (as shown by the "fast forward" icon 404). Conversely, a different "thumb flick inward" dynamic gesture (not shown), in which the thumb is extended inward toward the center of the steering wheel 24, could be interpreted as a command to navigate backward within A/V content playback, as shown by the "rewind" icon 406. It will be appreciated that some of the drawings include icons or graphics that are not present on the steering wheel itself; rather, the location of the icons or graphic represents how gestures in different locations are interpreted by the gesture-controlled device 100, and/or they indicate visual feedback that may be displayed to the driver on the display 104 while the driver is performing the illustrated gesture. For example, when the gesture-controlled device is in a "A/V content playback navigation" mode (as described below), some embodiments may display feedback on the display 104 consisting of an image of the steering wheel showing the "fast forward" icon 404 and "rewind" icon 406 located as shown in FIG. 4A, possibly along with a graphical representation of the driver's right hand as shown in FIG. 4A. Visual feedback is described in greater detail below.

Figure 4B:
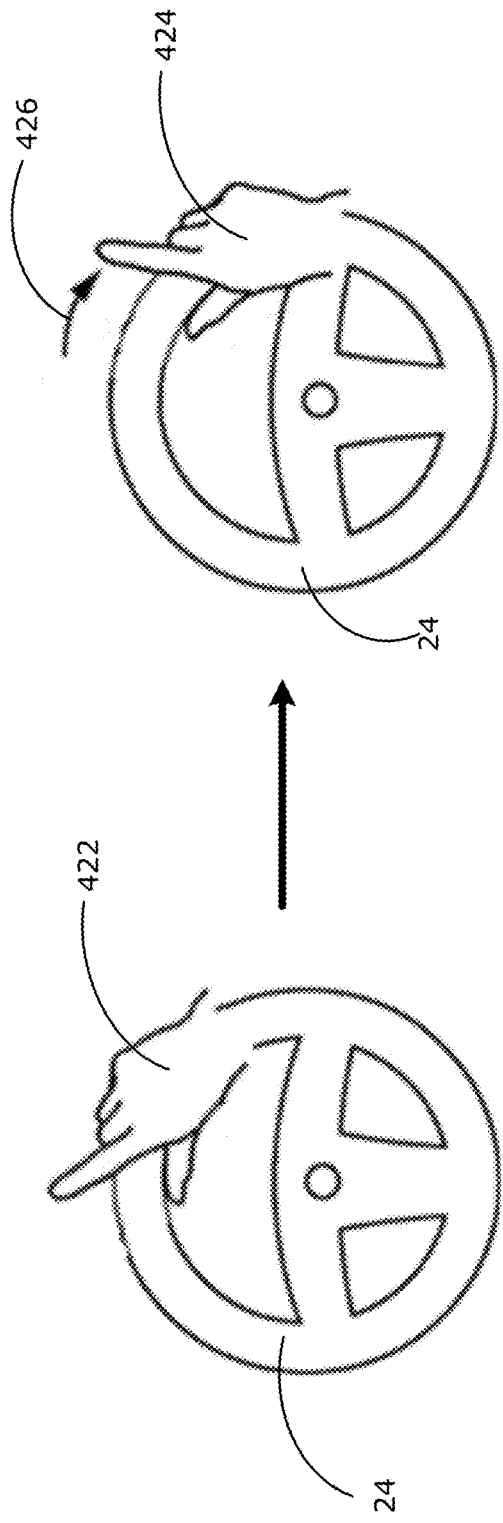
FIG. 4B illustrates an example "slide" dynamic gesture that may be detected and classified by an example gesture-controlled device.

FIG. 4B shows an example of a dynamic gesture class involving a single static gesture performed while the hand changes location. The driver's right hand is shown performing an "L-shape" gesture 302 in a first location 422 about the perimeter of the steering wheel 24, and then sliding along the perimeter of the steering wheel 24 to a second location 424 along the perimeter of the steering wheel 24. The sliding motion of the hand is shown by the hand sliding movement arrow 426. This dynamic gesture may be recognized by the gesture-controlled device 100 and interpreted as a command to increase the value of a setting corresponding to the "L-shape" gesture 302; for example, in an example in which the gesture-controlled device 100 maps the "L-shape" gesture 302 to an "adjust audio volume" function, recognition of the "L-shape" gesture 302 may place the gesture-controlled device 100 in an "adjust audio volume" state, and the sliding motion 426 while the hand is maintained in the "L-shape" gesture 302 may be interpreted as a command to adjust the audio volume setting in an increasing direction. Conversely, if the hand had moved in the opposite direction (i.e. counter-clockwise) (not shown) around the perimeter of the steering wheel 24 while maintaining the hand in the "L-shape" gesture 302, that could be interpreted as a command to adjust the audio volume setting in a decreasing direction. In this example, the "L-shape" gesture 302 may be referred to as a "slide gesture", insofar as recognizing the "L-shape" gesture 302 causes the gesture-controlled device to enter a "slide" state in which the sliding movement of the hand is mapped to adjustment of a setting value, and the "slide" state is exited when the hand stops performing the "L-shape" gesture 302.

Another way to characterize the dynamic gesture of FIG. 4B would be to say that the hand transitions from a "neutral" gesture 402 (not shown in FIG. 4B) to the "L-shape" gesture 302, followed by a sliding movement 426 while maintaining the "L-shape" gesture 302, followed by returning to a "neutral" gesture 402. Alternatively, the gestures performed before and after the "L-shape" gesture 302 may be any hand shape or gesture that is not interpreted as a specific command by the gesture-controlled device 100 in the current context.

Thus, some dynamic gestures may involve both combinations of gesture classes as well as changes in location of the hand, or a first static gesture in one location followed by a second static gesture in another location. For example, example embodiments described herein may refer to the "L-shape" gesture 302 as being a static gesture mapped to a "wake-up" function, after which the driver may perform an "encircle" gesture 304 on a virtual segment of the steering wheel 24 to select a function from a plurality of functions mapped to a plurality of virtual segments. However, in some embodiments the sequence of an "L-shape" gesture 302 (at an arbitrary location) followed by an "encircle" gesture 304 located at a specific virtual segment of the steering wheel 24 may be considered a single dynamic gesture. As a further example, some embodiments may interpret a "two-finger L-shape" gesture (not shown), similar to the "L-shape" gesture 302 but in which the middle finger is extended parallel to the index finger, as a "wake-up" command. Once the gesture-controlled device 100 is in an awake state, a "middle finger tap" dynamic gesture, in which the hand starts in the "two-finger L-shape" gesture and the middle finger is then angled forward to touch or tap the steering wheel 24, may be interpreted as a "function select" command that selects a function mapped to the virtual segment of the steering wheel 24 which is tapped by the middle finger.

Example Gesture Sensing System and Voice Command Recognition System

Figure 5:
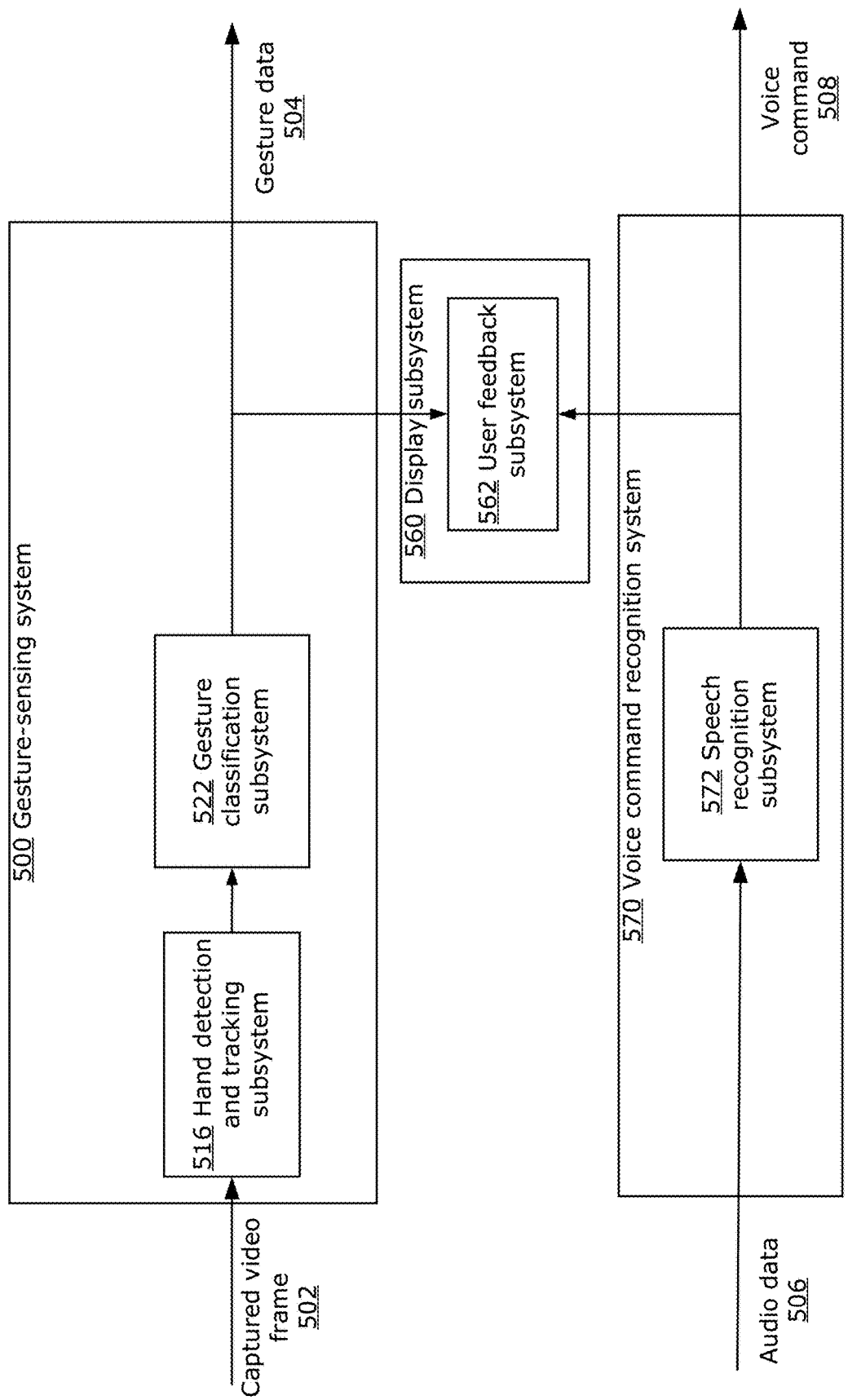
FIG. 5 is a block diagram illustrating some details of an example gesture-sensing system, an example voice command recognition system, and an example display subsystem that may be implemented in the example gesture-controlled device of FIG. 2.

FIG. 5 is a block diagram illustrating an example gesture-sensing system 500, an example voice command recognition system 570, and an example display subsystem 560. In some embodiments, the gesture-sending system 500, voice command recognition system 570, and display subsystem 560 may be implemented by the processor device 202 of the gesture-controlled device 100 when it executes instructions stored in the memory 208. In other embodiments, one or more of the gesture-sending system 500, voice command recognition system 570, and/or display subsystem 560 may be implemented by a remote server or cloud computing platform in communication with the gesture-controlled device 100 via the network interface 206.

The voice command recognition system 570 provides speech recognition for interpreting sound from the interior of the vehicle cabin, captured by the microphone 108 or another audio sensing device (such as a wireless audio headset of the driver in communication with the gesture-controlled device 100), as voice commands. The voice command recognition system 570 may use speaker-dependent or speaker-independent speech recognition in different embodiments. The voice command recognition system 570 includes a speech recognition subsystem 572 configured to receive audio data 506 (e.g., as provided by the microphone 108 either directly or after being pre-processed by other subsystems of the voice command recognition system 570) and generate voice commands 508 based on the audio data 506 using known speech recognition algorithms and techniques. For example, the speech recognition subsystem 572 may include an artificial neural network trained using training data consisting of audio recordings of speech by a number of human speakers, labeled to indicate the presence of voice commands selected from a limited lexicon of known voice commands, such that the trained neural network can recognize speaker-independent voice commands 508 spoken by a human speaker in the audio data 506.

The display subsystem 560 may be used to control the display 104, and in some embodiments to control one or more additional in-vehicle display devices. It includes a user feedback subsystem 562 for providing visual feedback to the driver, as described in greater detail below.

In this example, the gesture-sensing system 500 may be implemented using a hand detection and tracking subsystem 516 and a gesture classification subsystem 522. In the following examples, the gesture-sensing system 500 will be described as including several subsystems or providing the functions of several subsystems. However, in other examples, the gesture-sensing system 500 may include (or provide the functions of) only a subset of the described subsystems. In some examples, the gesture-sensing system 500 may not include distinct subsystems. Thus, the implementation of the gesture-sensing system 500 using distinct subsystems 516, 522 is optional.

A captured video frame 502 is received as input to the gesture-sensing system 500. The hand detection and tracking subsystem 516 performs hand detection on the frame. The hand detection and tracking subsystem 516 may use any suitable hand detection technique to detect a hand in the input frame 502 and to define a 2D or 3D bounding box for the detected hand.

In some examples, the hand detection and tracking subsystem 516 may use a trained neural network for performing hand detection. For example, a suitable neural network for hand detection may be a trained object detector such as using YoloV5 (e.g., as described in Redmon et al. "Yolov5: An incremental improvement," arXiv preprint arXiv: 1804.02767, 2018) based on a residual neural network (ResNet) architecture such as ResNet54 (e.g., as described in He, Kaiming, et al. "Deep residual learning for image recognition." Proceedings of the IEEE conference on computer vision and pattern recognition. 2016). Another example may be a trained single shot detector (SSD) such as multibox SSD (e.g., as described in Liu et al. "Ssd: Single shot multibox detector." European conference on computer vision. Springer, Cham, 2016.) based on a convolutional neural network (CNN) architecuture such as MobileNetV2 (e.g., as described in Sandler et al. "Mobilenetv2: Inverted residuals and linear bottlenecks." Proceedings of the IEEE Conference on Computer Vision and Pattern Recognition. 2018.). Hand tracking may be performed by the hand detection and tracking subsystem 516 using the Lucas-Kanade optical flow technique (as described in Lucas et al. "An iterative image registration technique with an application to stereo vision." Proceedings of Imaging Understanding Workshop, 1981).

The bounding box defined for the detected hand is used by the gesture classification subsystem 522 to perform identification and classification of the hand shape as a gesture class. In some embodiments, the bounding box may be provided by the hand detection and tracking subsystem 516 to the gesture classification subsystem 522 as a set of pixel coordinates along with the entire frame. In other embodiments, the frame may be cropped to the bounding box, and only the pixels within the bounding box may be provided to the gesture classification subsystem 522, potentially along with other data generated by the hand detection and tracking subsystem 516, such as steering wheel location data and hand location data indicating the location within the frame of the bounding box. In either of such type of embodiment, the gesture classification subsystem 522 may perform gesture classification on only the pixels within the bounding box, thereby reducing the image processing computation that must be performed.

The gesture classification subsystem 522 may use any suitable classification technique to classify the shape of the detected hand as a particular gesture class. For example, the gesture classification subsystem 522 may use a trained neural network (e.g., a CNN) that has been trained to classify a gesture according to a predefined set of gesture classes.

The gesture-sensing system 500 may generate as its output a set of gesture data 504, which may also include data generated by the hand detection and tracking subsystem 516 and/or the gesture classification subsystem 522. For example, in some embodiments the gesture data 504 may include hand location data (e.g., absolute location within the frame, location relative to the steering wheel, and/or hand bounding box coordinates), hand movement data, and/or steering wheel location data generated by the hand detection and tracking subsystem 516, as well as an identified gesture class recognized in the current frame, gesture history data (e.g. based on a queue of stored past identified gesture classes), and/or gesture duration data generated by the gesture classification subsystem 522.

A software application (e.g., an operating system) of the gesture-controlled device 100 may translate the gesture class 504 outputted by the gesture-sensing system 500 into a command (e.g., a command to execute a function). The translation of the gesture class into the command may be application-dependent, context-dependent, or state-dependent. For example, a given gesture class may be translated into a first command when a first application is active or in a first context or state of the device, but may be translated into a second command (or may be considered invalid) when a second application is active or in a second context or state of the device. Thus, in some embodiments, the gesture classification subsystem 522 may be used to recognize a hand gesture being performed by the hand in the frame and select a function for execution by the gesture-controlled device 100 based at least in part on the recognized hand gesture.

Figure 6:
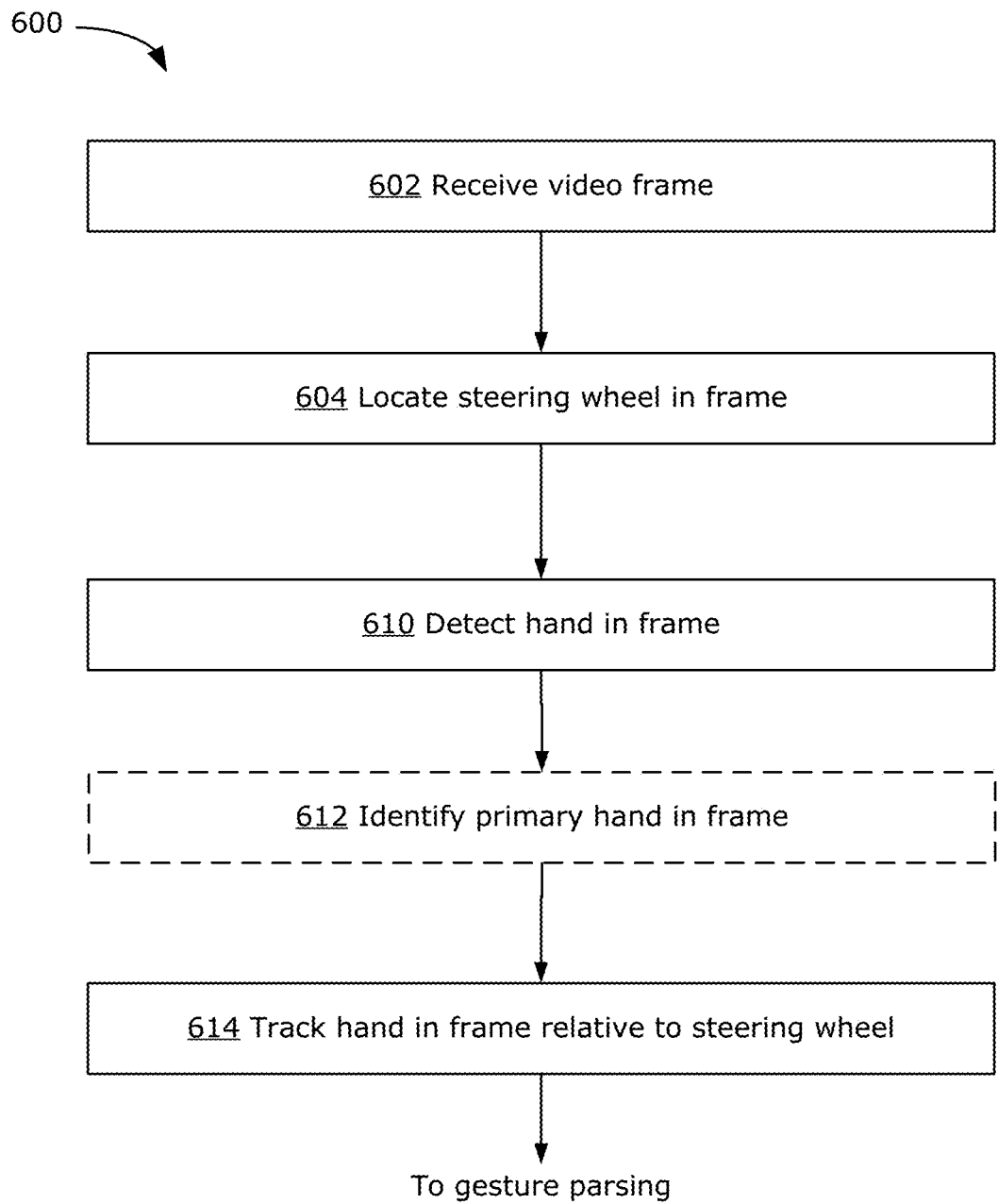
FIG. 6 is a flowchart illustrating an example hand-tracking method that may be performed by the gesture-sensing system of FIG. 5.

FIG. 6 is a flowchart illustrating an example hand-tracking method 600 that may be performed by the gesture-sensing system 500, for example using the hand detection and tracking subsystem 516.

At 602, a video frame 502 is received. Generally, video frames 502 are received one at a time, in real-time or near real-time. The video frame may be the raw, unprocessed data captured by the camera 102, or may be minimally processed (e.g., normalized).

At 604, the frame 502 is processed to determine a location of a steering wheel in the frame. In some embodiments, the hand detection and tracking subsystem 516 may be configured to recognize the steering wheel and track its location and orientation (such as its degree of rotation, and/or its location relative to the FOV 20 of the camera 102, which may change as a result of camera position and/or adjustment of the steering wheel tilt angle by the driver). In other embodiments, a separate steering wheel tracking subsystem (not shown) may be included in the gesture-sensing system 500 that locates and tracks the location and orientation of the steering wheel within the frame 502.

At 610, a hand is detected in the frame. If no hand is detected in the frame, it may be determined that there is no gesture input found in the received frame, and the method 600 may return to step 602 to receive the next frame. Assuming that at least one hand is detected in the frame, the method 600 proceeds to optional step 612.

Optionally, at 612, if more than one hand is detected in the input frame, one primary hand may be identified in the input frame. As described briefly above in reference to FIG. 1, the hand detection and tracking subsystem 516 may detect two hands in the frame, such as a left hand 22 and right hand 21 of the driver. In such cases, the gesture-sensing system 500 may refer to a primary hand configuration setting, such as a variable stored in the memory 208 of the gesture-controlled device 100, to determine whether the driver's right hand 21 or left hand 22 should be considered primary. In some embodiments, the non-primary hand is ignored by the hand detection and tracking subsystem 516 and the gesture classification subsystem 522 when the primary hand is detected in the frame. In other embodiments, the primary hand is only given priority when both hands are performing gestures: i.e., even if the primary hand is detected within the frame, the non-primary hand may nonetheless be tracked by the hand detection and tracking subsystem 516, and gestures performed by the non-primary hand may be recognized by the gesture classification subsystem 522, as long as the primary hand is not performing a gesture within the frame. Other configurations may be used in other embodiments, such as gestures currently being performed by the non-primary hand being tracked and recognized until the gesture is complete even if the primary hand enters the frame or begins performing a gesture.

At 614, the detected hand (or primary hand) is tracked in the input frame (e.g., using the hand detection and tracking subsystem 516). Information from detecting and tracking the hand (or primary hand) is provided for further parsing of the gesture. For example, a bounding box and optional identifier may be generated in order to track the detected hand. The bounding box (and optional identifier) may then be provided (e.g., to the gesture classification subsystem 522, or other hand classifier) to analyze and parse the gesture input.

In some embodiments, the location of the hand may be tracked relative to the steering wheel in the frame. For example, instead of or in addition to using a bounding box, the hand detection and tracking subsystem 516 may identify a radial position of the hand about the circumference of the steering wheel. Even in embodiments using a bounding box or other steering wheel-independent indication of hand location, the location of the hand within the frame may also be determined relative to the steering wheel for the purpose of the various hand-on-wheel gesture control methods described in greater detail below.

Thus, in some embodiments, the hand detection and tracking subsystem 516 determines the location of the hand relative to the steering wheel by identifying a left hand and a right hand of the driver in the frame, selecting the left hand or right hand as the hand used for gesture control based on the value of a primary hand setting, and determining the location of the hand used for gesture control relative to the steering wheel.

Figure 7:
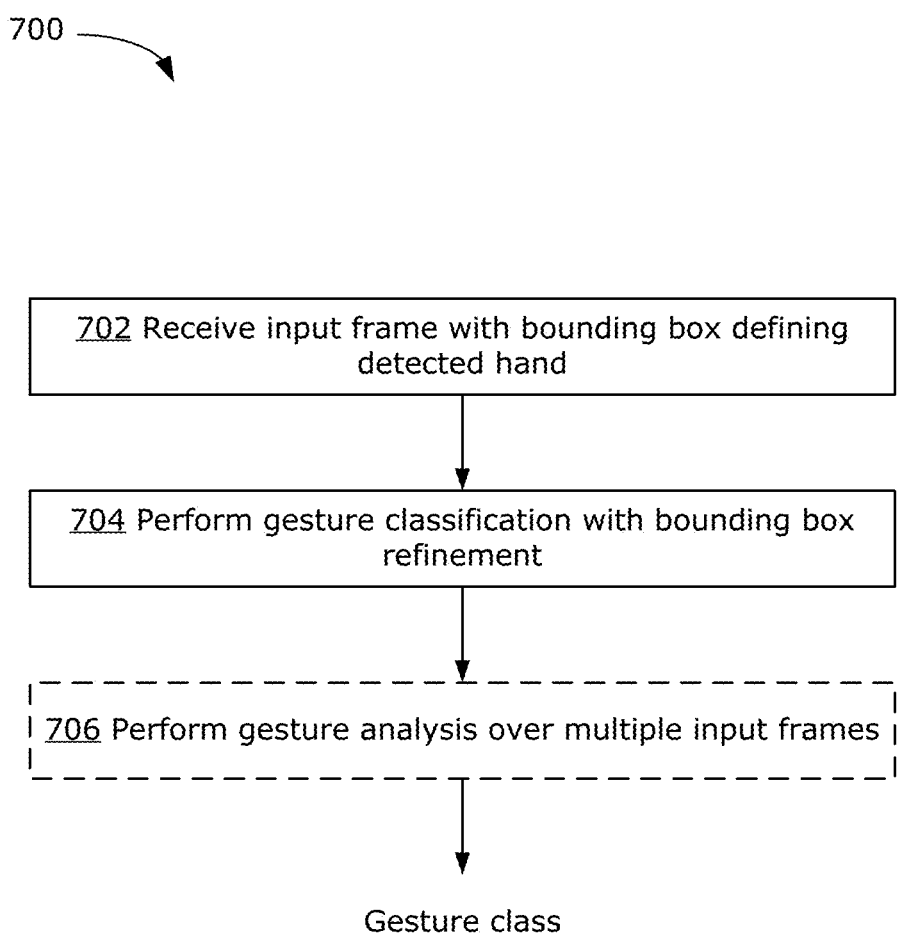
FIG. 7 is a flowchart illustrating an example gesture recognition method using bounding box refinement based on a hand detected by the method of FIG. 6.

In some examples, the hand tracking method 600 may be implemented by the gesture-sensing system 500 using only the hand detection and tracking subsystem 516. Instead of outputting a gesture class (as shown in FIG. 7), the gesture-sensing system 500 may output information about the tracked hand (e.g., the bounding box, or the radial location of the hand relative to the steering wheel) to a software application (such as the operating system) to translate the hand tracking information into a command. For example, different radial locations of the hand relative to the steering wheel may, in some contexts, cause the hand detection and tracking subsystem 516 to output information about the tracked hand, which is used by the software application to select one of a plurality of functions of the gesture-controlled device 100 and cause the gesture-controlled device 100 to execute the selected function. Thus, for example, the software application may cause the gesture-controlled device 100 to execute a function of the gesture-controlled device 100, the function being selected from a plurality of functions based on the location of the hand relative to the steering wheel in the frame.

In some examples, the hand tracking method 600 may be used to process every video frame captured by the camera 102. In other examples, the hand tracking method 600 may only be used when a gesture input is expected. For example, the hand tracking method 600 may be initiated in response to a command input (e.g., via voice input). In some embodiments, a voice command may be recognized (e.g., by the voice command recognition system 570) and interpreted as a "wake-up" voice command, causing the gesture-controlled device 100 to execute a wake-up function to enter an awake state. The hand tracking method 600 is performed during the awake state. Thus, in some embodiments, prior to processing the video frame 502, the gesture-controlled device 100 processes the audio data 506 to detect a wake-up voice command.

In some embodiments, a first hand gesture may be recognized, thereby transitioning the gesture-controlled device from an initial state into a new state in which different gestures may be recognized or may be interpreted as different commands than in the initial state. In this way, hierarchies of commands may be used to navigate a set of functions wherein the same gesture may have different interpretations at different levels of the hierarchy. For example, the interpretation of a current hand gesture may be altered by previous hand gestures performed during previous video frames. If a previous video frame had been processed to recognize a "wake-up" hand gesture being performed by the hand prior to processing a current video frame, thereby placing the gesture-controlled device 100 into an awake state, a hand gesture performed during the current frame may be interpreted as a command, whereas otherwise it might be ignored.

FIG. 7 is a flowchart illustrating an example gesture classification method 700 using bounding box refinement for performing gesture classification. The gesture classification method 700 may be implemented by the gesture classification subsystem 522.

At 702, the input frame is received as well as a bounding box defining the detected hand (e.g., outputted by the hand detection and tracking subsystem 516).

At 704, the gesture classification network with joint bounding box refinement network (as described above) may be used to perform gesture classification with bounding box refinement.

Optionally, at 706, gesture analysis may be performed over multiple input frames. For example, the gesture classification subsystem 522 may store a buffer of previous input frames and perform gesture analysis by considering the previous input frames.

A buffer (e.g., implemented in the gesture-sensing system 500) may be used to store a predetermined number of previous input frames. The number of previous input frames that are stored in the buffer may be relatively small (e.g., 10-30 previous input frames), for more efficient use of memory resources. In some examples, the buffer may additionally or alternatively store the results of the gesture analysis performed on the small number of previous input frames.

For a single static gesture to be recognized, the gesture classification subsystem 522 may require that the same gesture class be detected a predefined minimum number of times (K) over a predefined number of previous input frames (N), where $K \geq 1$ and $K \leq N$. This requirement may help to improve detection accuracy and reduce false positives. In some examples, the same gesture class may need to be detected over K consecutive input frames over N previous input frames. The predefined minimum K may be selected to be a relatively small number (e.g., 10) to enable better detection and still achieve near real-time gesture classification. Static gestures that may be detected using this approach may include, for example, the mute gesture 38 (e.g., for mute or unmute commands) or the open hand gesture 30 (e.g., for play or pause commands). The N previous input frames may be stored in the buffer, and may be used as a sliding window for detecting gestures, to help reduce false positives.

A dynamic gesture may be recognized by the gesture classification subsystem 522 based on a combination of two or more static gestures. For example, a complete dynamic gesture may be decoupled into different states, where transition between states is the result of detection of a static gesture. The gesture classification subsystem 522 may implement a set of predefined state transition rules, for state-based classification of dynamic gestures.

Figure 8:
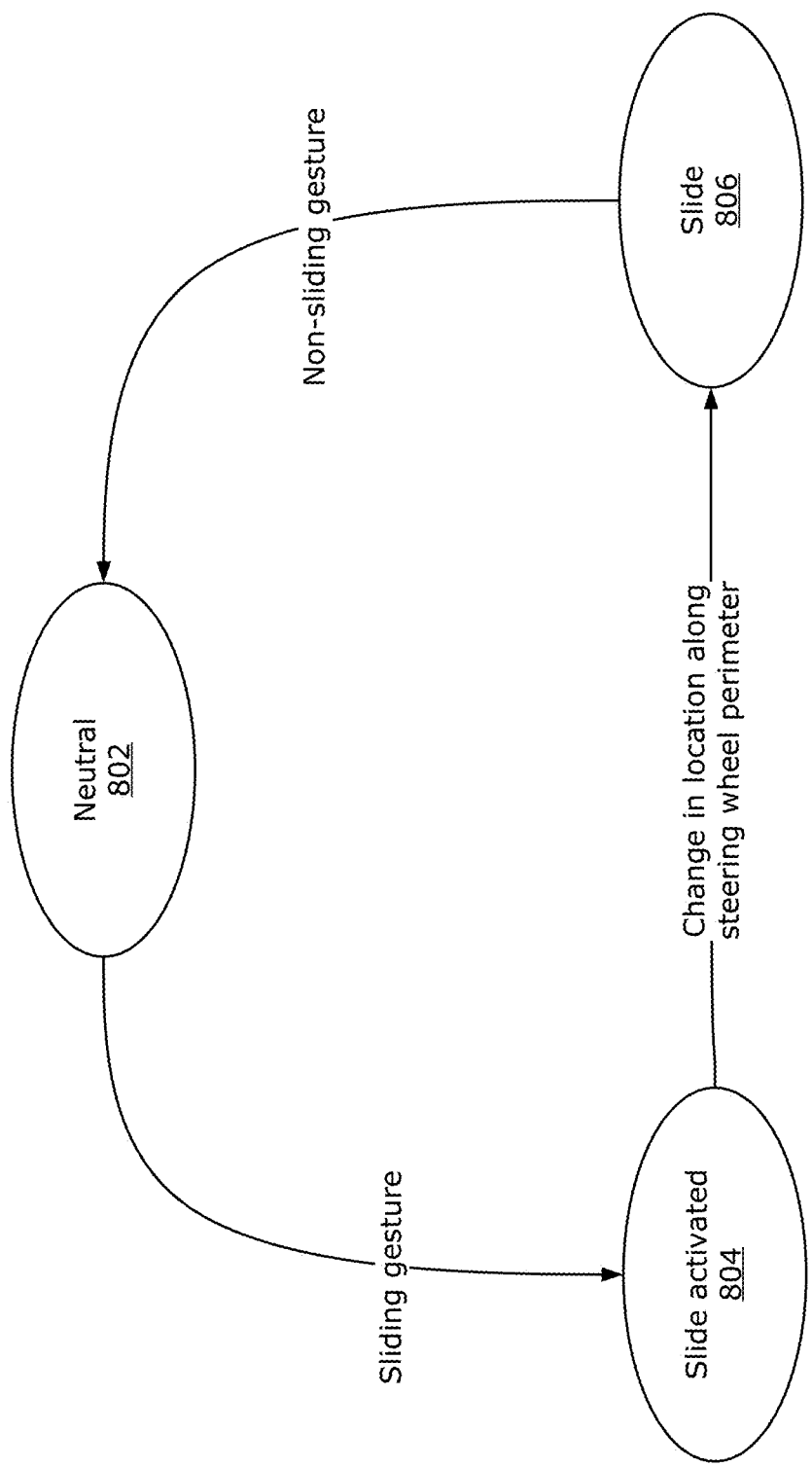
FIG. 8 is a state diagram illustrating an example of state-based gesture recognition.

FIG. 8 is a state diagram illustrating an example of state-based classification of dynamic gestures, which may be implemented by the gesture classification subsystem 522. The neutral state 802 may be initial state by default when gesture input is first activated, or when a current valid gesture is not detected.

A slide dynamic gesture may be detected when a "neutral" gesture 402 is first detected, followed by detection of an "L-shape" gesture 302 to transition to the slide activated state 804. From the slide activated state 804 and staying in the "L-shape" static gesture 302, a change in hand location (e.g., a change that is greater than a predefined threshold) along the perimeter of the steering wheel 24 causes a transition to the slide state 806. Upon reaching the slide state 806, the gesture classification subsystem 522 may generate a gesture class output 504 indicating the recognized gesture (e.g., gesture class label) and may further provide output indicating a direction and magnitude of the movement along the perimeter of the steering wheel. For example, the hand detection and tracking subsystem 516 may calculate the radial distance traveled by the hand (e.g., based on coordinates defined in the video frame) and output this value as a movement magnitude value. The hand detection and tracking subsystem 516 may also determine the radial direction of the hand's movement (i.e., clockwise or counter-clockwise) and output a value as a movement direction value. The magnitude and direction values may be used to map the dynamic slide gesture to a slide command, which in some examples may be a command to adjust a setting value. The direction value may determine the direction of the setting value adjustment (e.g., increase if clockwise, decrease if counter-clockwise), and the magnitude value may determine the magnitude of the adjustment. From the slide state 806, detection of the "neutral" gesture 402 causes a transition to the neutral state 802. In some embodiments, any gesture other than the "L-shape" gesture, or the failure to recognize any gesture being performed by the hand, may be sufficient to transition to the neutral state 802.

Thus, in some embodiments the hand is considered to be performing a slide gesture beginning at a frame that shows the end of a transition from the first neutral gesture 402 to the "L-shape" gesture 302, and ending at a frame that shows the end of a transition from the "L-shape" gesture 302 to the second neutral gesture 402. This detection of a dynamic slide gesture is performed over multiple input frames, as described at step 706 of method 700 above.

In other embodiments, a single static hand gesture may trigger the gesture-controlled device to enter a slide state, and the slide state ends when the hand is no longer performing the static hand gesture. Thus, for example, recognition of a "L-shape" gesture 302 may cause the device to enter a slide state regardless of whether the "L-shape" gesture 302 is preceded by a neutral gesture 402. In some such embodiments, the device may only enter the slide state if the static gesture is performed in a particular way, e.g., within a specific region of the steering wheel or frame, or held for a specific period of time. In embodiments using a static gesture to trigger a slide state, the hand may be considered to be performing a slide gesture during any frame in which the hand is performing the specified static gesture.

For dynamic gestures that involve a change in location, the gesture classification subsystem 522 may implement predefined rules based on laws of physics and/or expected human motion, to further exclude possible false positives. For example, a predefined rule may be that a detected hand should not exhibit a change in location that is greater than a predefined threshold (e.g., a change of more than 100 pixels) between consecutive input frames.

Using state-based gesture recognition may be advantageous over motion-based gesture segmentation and recognition. For example, significantly higher processing resources may be required to detect and process gesture motion, compared to detecting static gestures. Further, state-based gesture recognition may be less prone to false positives.

Thus, in some embodiments, the gesture-based device 100 may adjust a setting value by the use of a dynamic gesture including movement of the hand between two radial locations on the perimeter of the steering wheel. The hand detection and tracking subsystems 516 may be used to determine a movement of the hand relative to the steering wheel based on the location of the hand relative to the steering wheel in a current video frame and a location of the hand relative to the steering wheel in one or more previous video frames. The dynamic gesture being performed by the hand may cause the gesture-based device 100 to execute an "adjust setting value" function that changes a value of a setting used by the gesture-controlled device 100. The magnitude of change of the value by the function may be based on a magnitude of the movement, and, if the value may be changed in at least two directions, the direction of the change of the value by the function may be based on a direction of the movement. The direction and magnitude of the movement may be determined based on a starting location of the hand at a first location on the perimeter of the steering wheel in one of the previous frames, and a current location of the hand at a second location on the perimeter of the steering wheel in the frame.

Example Mappings of Steering Wheel Virtual Segments

As described briefly above, the gesture-controlled device 100 may virtually segment the steering wheel into a plurality of virtual segments. In some embodiments, this virtual segmentation may be performed by the hand detection and tracking subsystem 516 or a separate steering wheel tracking subsystem. The location and orientation of the steering wheel 24 in the frame may be determined, and different regions of the steering wheel (e.g., segments along the perimeter of the steering wheel) in the frame may be mapped to different functions, such that hand gestures performed in those regions are interpreted as commands invoking the functions mapped to those regions. In some examples, a region of the steering wheel may be mapped to a range of continuous values, with a first end of the region corresponding to a beginning of the range and a second (typically opposite) end of the region corresponding to an end of the range.

FIG. 9A shows an example virtual segmentation of a steering wheel 24 into regions 912, 914, 916, 918 around its perimeter corresponding to different control functions 922, 924, 926, 928. A first function 922 is mapped to the first region 912, a second function 924 is mapped to the second region 914, a third function 926 is mapped to the third region 916, and a fourth function 928 is mapped to the fourth region 918. Each region 9112, 914, 916, 918 is a virtual segment along the perimeter of the steering wheel in this example. In some examples, upon detecting a hand 902 performing a "function select" gesture (shown here as encircle gesture 304) within one of the regions (in this example, second region 914) while the gesture-controlled device 100 is in a "ready to select function" state, the gesture-controlled device 100 may execute the second function 924 mapped to the corresponding region (i.e., second region 914).

FIG. 9B shows an example virtual segmentation of a steering wheel 24 showing an arc 956 (i.e. radial region) around its perimeter corresponding to a range of values for a setting used by a gesture-controlled device 100. The arc 956 is a region of the steering wheel 924, specifically a virtual segment along the perimeter of the steering wheel in this example. A first end of the arc 956 corresponds to a minimum value of the setting value (i.e. a beginning of the range). A second end of the arc 954 corresponds to a maximum value of the setting value (i.e. an end of the range). In some examples, upon detecting a hand 902 performing a slide gesture (shown here as encircle gesture 304) within the region (i.e. arc 956) while the gesture-controlled device 100 is in a slide state, the gesture-controlled device 100 may execute an "adjust setting value" function as described above with reference to FIG. 8, or to adjust the value of the setting to a value corresponding to the location of the hand within the region (e.g., a setting value corresponding to the radial location of the encircle gesture 304 between the minimum value 952 and maximum value 954).

In some embodiments, a region of the steering wheel may be defined and mapped dynamically to a range of continuous values, like the arc 956 of FIG. 9B. Rather than pre-defining the radial locations corresponding to the minimum value 952 and maximum value for a setting value, the gesture-controlled device 100 may define a current hand location as corresponding to a current setting value, with movement in one direction or the other (clockwise or counter-clockwise) being interpreted as a command to adjust the value in one direction or another (e.g., upward or downward, or forward or backward). This approach may be used, for example, in embodiments using a unique gesture mapped to a function for adjusting the value of a particular setting, such as the example discussed above with reference to FIG. 4B.

In some embodiments, the driver can configure the mappings of functions to steering wheel regions. For example, the driver may be prompted to choose from a list of pre-defined function mapping configurations when he or she uses the vehicle's gesture control system for the first time. The driver may be assigned a driver account stored on the gesture-controlled device 100, which may store the driver's configuration choices. The mapping configuration chosen by the driver may be automatically applied afterward as long as the driver's account is active. In some embodiments, customized mapping may also be enabled, allowing the driver to change individual mappings of functions to regions to depart from the list of pre-defined function mapping configurations.

FIG. 10A shows an example function mapping configuration. It shows a virtual segmentation of the steering wheel 24 into regions 1002, 1004, 1006, 1008, 1010, 1012 around its perimeter, each region corresponding to a control function: first region 1002 is mapped to a function for adjusting audio volume 1022, second region 1004 is mapped to a function for pausing playback of audiovisual content 1024, third region 1006 is mapped to a function for navigating audiovisual content playback 1026, fourth region 1008 is mapped to a function for adjusting HVAC fan speed 1028, and fifth region 1010 is mapped to a function for adjusting HVAC temperature 1030. A sixth region 1012 at the bottom of the steering wheel 1024 is left un-mapped to any function.

FIG. 10B shows an example virtual segmentation of a steering wheel 24 showing an arc 1031 around a segment of its perimeter. By moving a hand to a radial location within the arc 1031, a value of an audiovisual content playback position setting (i.e. a temporal position within a piece of A/V content such as a song or video) may be selected from a range of values. The arc 1031 extends between a first end 1032 corresponding to the beginning of the range of values (i.e. temporal position 0:00, indicating the beginning of the song or video) and a second end 1034 corresponding to the end of the range of values (i.e. temporal position 2:30, indicating the end of the song or video, which is 2 minutes and thirty seconds long). By placing a hand on the arc 1031 and moving it from a first position 1036 to a second position 1038, the playback position value may be advanced from 1:25 to 2:10. In some examples, it is not necessary to move the hand between the first position 136 and second position 138; placing the hand at the second position 138 will accomplish the same effect, namely advancing the playback position to 2:10.

FIG. 10C shows an example virtual segmentation of a steering wheel 24 into virtual segments corresponding to several functions used to adjust a continuous setting value. A first segment 1050 is mapped to an audiovisual content playback navigate backward function 1060, a second segment 1052 is mapped to an audiovisual content playback navigate forward function 1062, and a third segment 1054 is mapped to an exit function 1064. Upon detecting a hand (or a hand performing a particular gesture) within one of the regions 1050, 1052, 1054, the corresponding function 1060, 1062, 1064 may be executed by the gesture-controlled device. For example, upon detecting a hand performing a "select" gesture (e.g., "encircle" gesture 304) within the second region 1052, the playback position may be advanced by a predetermined amount by executing the playback position advance function 1062. The playback position may continue to advance at a predetermined rate as long as the "select" gesture is being performed within the second region 1052. Similarly, upon detecting a hand performing a "select" gesture within the third region 1054, an exit function 1064 may be executed, thereby either ending the gesture control session (as described below) or reverting the state of the gesture-controlled device 100 to a previous state (e.g., not an "adjust playback position" state).

In some embodiments, gesture control of the gesture-controlled device 100 may be performed in sessions that are demarcated by a session begin event and a session end event. In some embodiments, a session begin event may be a "wake-up" voice command or "wake-up" gesture as described above. Sessions may be ended in a number of different ways, and some embodiments may use any of more than one type of event to trigger a session end. Once a session ends, the current gesture control state or context of the gesture-controlled device may revert to a neutral or dormant state until a further session start event occurs.

Session end events may be based on recognized gestures, timing, recognized voice commands, and/or other criteria, including combinations thereof. In some examples, recognition of a cancellation gesture being performed by the driver's hand may constitute a session end event. In some examples, a timer is used to detect that a predetermined gesture time-out time has passed without any gestures being performed or without any actions being taken (e.g. no movement of a slide gesture), triggering a session end event. In some embodiments, a session end voice command (such as the word "End" or "Cancel") may constitute a session end event when recognized. In some examples, the steering wheel being rotated more than a predetermined angle away from its neutral position (thereby indicating a sharp turn) will constitute a session end event, thereby potentially improving driving safety.

Example Visual Feedback

As described above with reference to FIG. 5, a user feedback subsystem 562 may be used to present visual feedback to the driver on the display 104, e.g., to assist in navigating the function mapping configuration or the hierarchy of commands. The icons, graphics, and steering wheel images shown in FIGS. 4A-4B and 9A through 10C are examples of visual feedback that may be presented to drivers in various contexts.

In a first example, when the gesture-controlled device 100 is in an "adjust playback position" state, the image of FIG. 4A (including the steering wheel 24, icons 404 and 406, and optionally the hand in one or more neutral and/or thumb-flick positions, with or without movement arrows) may be presented on the display to prompt or remind the driver to flick his or her right thumb outward to advance playback or inward to rewind playback.

In a second example, the image of FIG. 4B may be used to remind the driver how to perform a slide gesture using the "L-shape" gesture 302. This may be presented, for example, in response to a voice command asking to be reminded how to perform a particular setting value adjustment gesture command.

In a third example, the images of FIGS. 9A and/or 9B (with or without the hand) may be used when configuring the driver profile to customize the function mapping configuration. The icons of FIG. 9A corresponding to the functions 922, 924, 926, 928 may be shown to indicate the current functions mapped to each respective region 912, 914, 916, 918. The image of FIG. 9B may be used to indicate the locations corresponding to the minimum value 952 and maximum value 954 for adjusting the continuous setting value mapped to the arc 956. In some embodiments, while the image of FIG. 9A is being presented, the driver may select one of the regions (such as second region 914) by performing a select gesture within the region (as shown in FIG. 9A). This will highlight the icon showing the second function 924, as shown in FIG. 9A ("Function 2"). The driver may then use another input modality, such as voice commands or touchscreen input, to select a new function to map to the second region 914 (e.g., by speaking the name of the desired function).

In a fourth example, when the gesture-controlled device 100 is in a "select function" state, the image of FIG. 10A (including the steering wheel 24 and icons 1022, 1024, 1026, 1028, 1030) may be presented on the display to prompt the driver to select a segment corresponding to the desired function.

In a fifth example, when the gesture-controlled device 100 is in an "adjust playback position" state, the image of FIG. 10B (including the steering wheel 24 and some or all of the graphics shown within arc 1031) may be presented on the display to show the driver the current playback position, the minimum playback position value (i.e. "0:00"), and/or the maximum playback position value (i.e. "2:30"). The current playback position value may be indicated by a progress bar graphic and/or a text display (e.g., "1:25" or "2:10").

In a sixth example that is an alternative to the fifth example above, when the gesture-controlled device 100 is in an "adjust playback position" state, the image of FIG. 10C (including the steering wheel 24, the icons 1060, 1062, 1064, and some or all of the graphics shown within arc 1040) may be presented on the display to prompt the driver to select one of the three functions 1050, 1052, 1054 and/or show the driver the current playback position 1048, the minimum playback position value 1042 (i.e. "0:00"), and/or the maximum playback position value 1044 (i.e. "3:40"). The current playback position value may be indicated by a progress bar graphic and/or a text display.

The various states referred to above may be triggered by some combination of gesture commands, voice commands, or other conditions. For example, in the fourth example above (showing FIG. 10A), the "select function" state may be triggered by a session begin event such as a wake-up voice command or wake-up gesture. Thus, in embodiments using a wake-up gesture as the session begin event, a video frame is processed to recognize a wake-up hand gesture being performed by the hand in the frame, and then, in response to recognizing the wake-up hand gesture, visual feedback is displayed to the driver indicating a plurality of functions corresponding to a plurality of portions of the circumference of the steering wheel.

In some embodiments, other forms of feedback may be presented to the driver, such as audio feedback. For example, in the fourth example above (showing FIG. 10A), after the user has selected a function by performing a "select" gesture in one of the regions of the steering wheel, the speakers of the A/V system 110 may be used to play audio feedback identifying the selected function by name. Other forms of audio feedback may be used as well, such as clicking sounds played when cycling between functions or values or when adjusting a setting value, with the time period between the clicking sounds being inversely proportional to the magnitude or speed of the driver's hand movement causing the setting value to be adjusted or the functions or values to be cycled through. It will be appreciated that other forms of visual and/or audio feedback may be used.

Example Methods of Hand-On-Wheel Gesture Control

The various gesture types, voice commands, function mapping configurations, and visual feedback types may be combined in various ways to enable drivers to issue commands to a gesture-controlled device 100 and to navigate hierarchies of such commands. Four example methods for hand-on-wheel gesture control will now be described with reference to FIGS. 11-14. It will be appreciated that these four examples are not intended to be limiting, and that the elements described in the previous sections may be combined in various ways in different embodiments.

Figure 11:
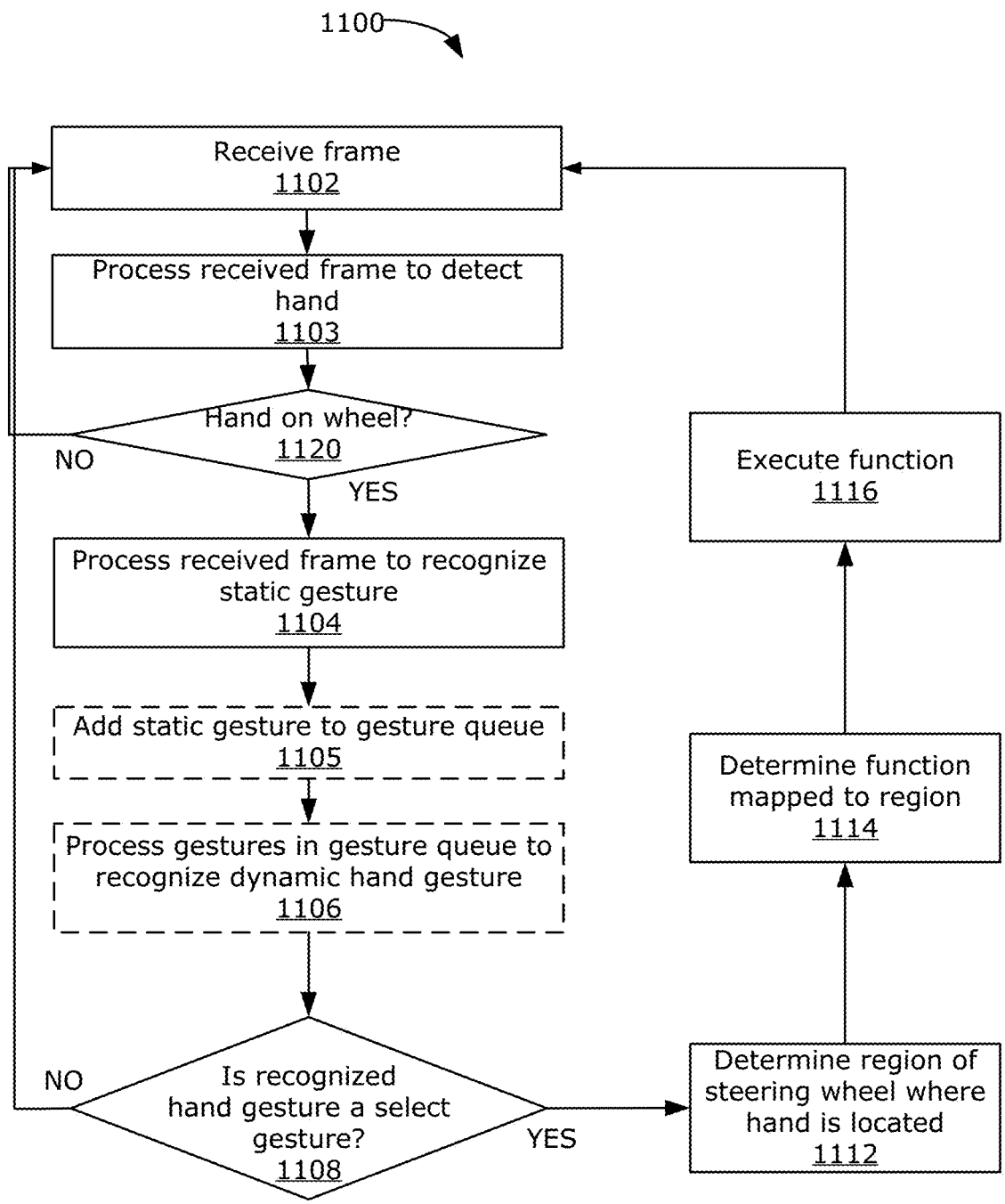
FIG. 11 is a flowchart illustrating a first example method for controlling the gesture-controlled device of FIG. 2 using hand-on-wheel gestures.

FIG. 11 shows a first example method 1100 for controlling a gesture-controlled device 100 using hand-on-wheel gestures. In this method 1100, a "select" hand gesture (also called a select gesture) is recognized, and the location relative to the steering wheel in which the gesture is performed determines a function that is executed by the resulting command, based on a function mapping configuration and virtual segmentation of the steering wheel. For example, if the method 1100 uses the function mapping configuration shown in FIG. 10A, and the select gesture is performed in the first region 1002, the "adjust audio volume" function will be executed, thereby placing the gesture-controlled device 100 into an "adjust audio volume" state.

The method 1100 may be implemented in software (i.e. instructions stored in memory 208) that is executed by processor 202. In some embodiments, as described below, the method 1100 is performed by the gesture-sensing system 500. The method 1100 may include additional or fewer actions than shown and described, and may be performed in a different order. Computer-readable code or instructions of the software that implements the method 1100, when executed by the processor 202 of the gesture controlled device 100, may be stored in the memory 208 or a processor-readable medium.

The method 1100 begins at step 1102. At 1102, a frame captured by the digital camera 102 is received by the gesture-sensing system 500. The method 1100 then proceeds to step 1103. At 1103, the received frame is processed (e.g., by the hand detection and tracking subsystem 516) to detect a hand, e.g., in accordance with hand tracking method 600 described above with reference to FIG. 6. The method 1100 then proceeds to step 1120. Step 1103 may include the gesture-sensing system 500 determining a location of the hand relative to the steering wheel based on the received frame, as described above with reference to method 600 of FIG. 6. In some embodiments, this may first involve determining a location of the steering wheel (e.g., using a steering wheel tracking subsystem), followed by determining a location of the hand relative to the steering wheel (e.g., using the output of the hand detection and tracking subsystem 516, such as the hand bounding box). In some embodiments, determining the location of the hand relative to the steering wheel may include determining a radial position of the hand relative to the center of the steering wheel. Some embodiments may be configured to detect and recognize hand gestures that are performed on the steering wheel, or near enough to the steering wheel that the hand gestured are visible within the frame, as described above.

At 1120, if the hand is determined to be located on the steering wheel, or sufficiently close to the steering wheel to enable the recognition and classification of gestures, then the method 1100 then proceeds to step 1104. Otherwise, the method 100 returns to step 1102 to receive the next frame. The determination of whether the hand is sufficiently close to the steering wheel may be made in some embodiments by defining the regions of the steering wheel (as discussed with reference to FIGS. 9A-10C above) such that the regions include some portion of the frame outside of the circumference of the steering wheel. It will be appreciated that other approaches may allow the gesture-controlled device 100 to determine that a hand is sufficiently close to the steering wheel, e.g. determining that the hand is within a predetermined distance from the circumference of the steering wheel.

At 1104, the received frame is processed (e.g., using the gesture classification subsystem 522) to recognize that the hand is performing a hand-on-wheel gesture (hereinafter simply gesture) and classify the recognized gesture, e.g., in accordance with gesture classification method 700 described above with reference to FIG. 7. The gesture recognized and classified at step 1104 may be a static gesture being performed in the current frame, or (if optional steps 1105 and 1106 are included) a dynamic gesture performed over multiple frames.

Optionally, the method then proceeds to step 1105. At 1105, the current gesture is added to a queue of gestures stored, e.g., in memory 208. The method then proceeds to step 1106. At optional step 1106, gestures stored in the queue of gestures are used to identify a current dynamic gesture, i.e. a movement of the hand between two or more static gestures over the course of multiple frames, as described in detail above with reference to FIGS. 4A-4B.

At 1108, the gesture-sensing system 500 determines whether the recognized gesture is a select gesture. In some embodiments, the select gesture may be the encircle gesture 304. If, at step 1108, the gesture-sensing system 500 determines that the recognized gesture is a select gesture, the method 1100 proceeds to step 1112. Otherwise, the method 1100 returns to step 1102 to receive the next frame.

At 1112, the gesture-sensing system 500 determines a region of the steering wheel within which the hand is located. In some embodiments, as described above, the regions of the steering wheel may be defined as radial regions or segments or portions of the circumference of the steering wheel. In other embodiments, the steering wheel may be used as a reference to segment some or all of the frame into regions.

At 1114, the gesture-controlled device 100 determines what function is mapped to the region determined at step 1112. The function mapping may be determined with reference to a driver profile as described above, or to a default profile or fixed function mapping configuration. Examples of functions mapped to regions are shown in FIGS. 10A and 10C.

At 1116, the function determined at step 1114 is executed by the gesture-controlled device 100.

Thus, in method 1100, a "select" gesture (such as encircle gesture 304) may be performed within one of the regions defined as portions of the circumference of the steering wheel, resulting in the execution of a function mapped to that region. In some embodiments, hierarchies of commands may be navigated using method 1100 repeated several times, with some of the functions changing the state of the gesture-controlled device 100 such that the function mapping configuration is changed. For example, in an initial state, the gesture-controlled device 100 may have the function mapping configuration of FIG. 10A. Upon recognizing a select gesture being performed in the third region 1006 at steps 1104 and 1112, the function for navigating audiovisual content playback 1026 is executed, transitioning the gesture-controlled device 100 into an "adjust A/V playback position" state in which the function mapping configuration changes to the one shown in FIG. 10C. Method 1100 is performed again, and upon recognizing a select gesture being performed in the second region 1052 at steps 1104 and 1112, the function for advancing the playback position 1062 is executed, thereby advancing the playback position of the A/V content.

In some embodiments, visual and/or audio feedback may be presented to the driver as described above. For example, when a select gesture is detected on the steering wheel in the initial state (i.e. with the function mapping configuration of FIG. 10A), the visual feedback shown in FIG. 10A may be presented on the display 104 to allow the driver to continue with the function selection or to slide the hand into a different region before the function is executed (e.g., after a predetermined length of time). After the transition to the "adjust A/V playback position" state, the visual feedback of FIG. 10C may be presented, including the function icons and a progress bar showing the current playback position.

Thus, the function selected in the "adjust A/V playback position" state may change a value of a setting used by the gesture-controlled device (namely the A/V playback position value), and the function is selected by determining that the location of the hand is within a portion of a circumference of the steering wheel.

Figure 12:
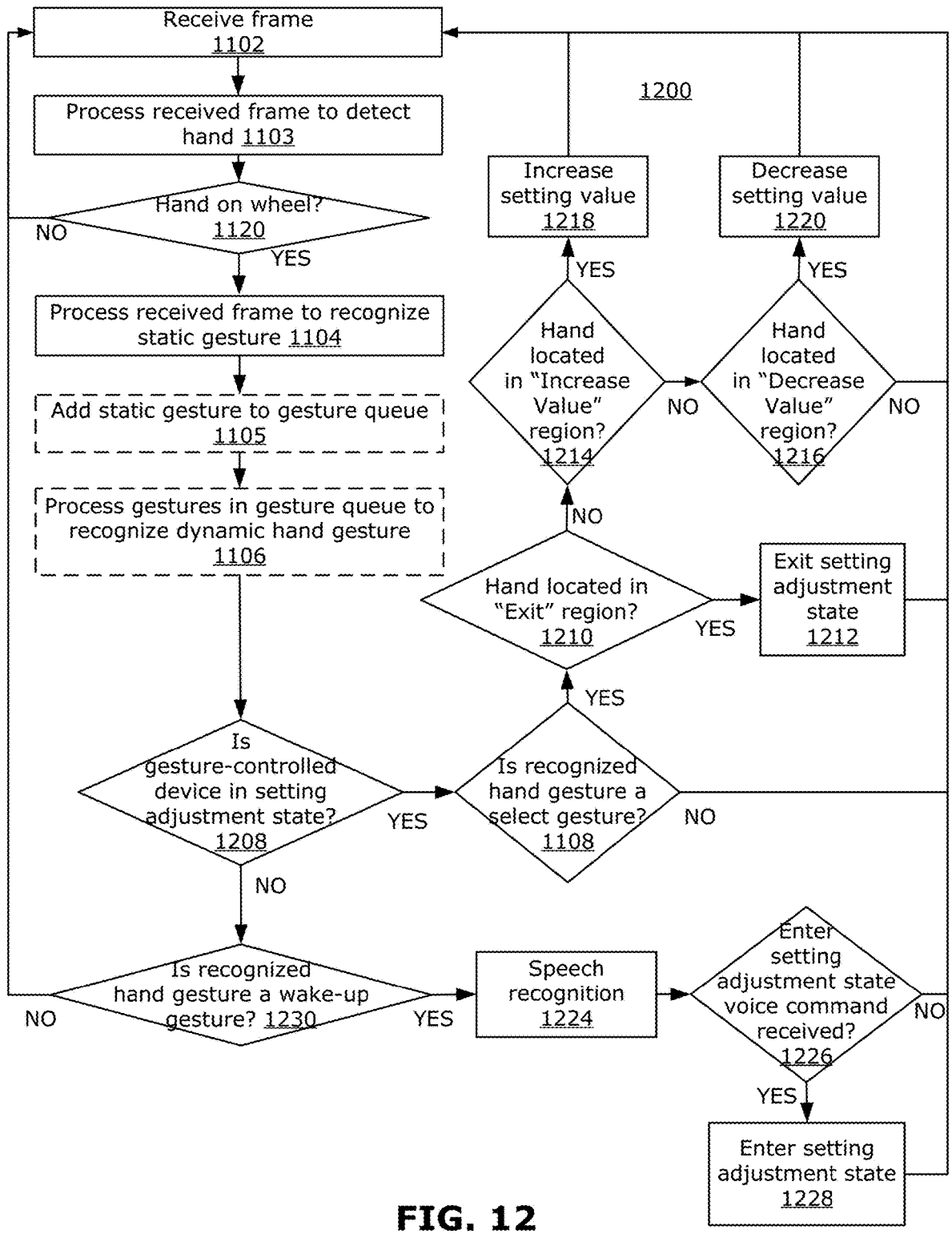
FIG. 12 is a flowchart illustrating a second example method for controlling the gesture-controlled device of FIG. 2 using hand-on-wheel gestures.

FIG. 12 shows a second example method 1200 for controlling the gesture-controlled device 100 using hand-on-wheel gestures. In this method 1200, a hierarchy of commands is navigated in stages. First, a wake-up gesture is recognized, putting the device into an awake state. Second, a voice command is used to select a function from a plurality of functions. Third, if the selected function is a function to adjust a setting value, a new function configuration mapping is provided to allow the driver to adjust the setting value by selecting different regions of the steering wheel using gestures.

Various steps in method 1200 are identified by the same reference numerals as steps of the method 1100 of FIG. 11.

These steps of method 1200 operate identically or analogously to those steps, and will not be re-described.

Steps 1102 through 1006 proceed as in method 1100.

At 1208, the gesture-controlled device 100 determines whether it is in a setting adjustment state (e.g., an "adjust A/V content playback position" state, or an "adjust HVAC temperature" state). Typically, the setting adjustment state is entered in response to recognition, in earlier audio data, of a voice command selecting a setting adjustment function. If, at 1208, the gesture-controlled device 100 is in a setting adjustment state, the method 1200 proceeds to step 1108. Otherwise, the method 1200 proceeds to step 1230.

At 1210, the gesture-sensing system 500 determines whether the driver's hand detected at 1102 is in an "exit" region of the steering wheel (or proximate thereto). Between steps 1108 and 1210, the gesture-controlled device 100 may be assumed to have performed hand location and steering wheel locations steps such as those of step 1112 of method 1100, but these are not shown in FIG. 12 to simplify the flowchart. If the hand is within the exit region (e.g., third region 1054 of the function configuration mapping of FIG. 10C), the method 1200 proceeds to step 1212, otherwise it proceeds to step 1214.

At 1212, the gesture-controlled device 100 exits the setting adjustment state and returns to step 1102 to receive the next frame. The gesture-controlled device 100 may revert to an earlier state, such as a function selection state (with the function configuration mapping of FIG. 10A), or it may end the session.

At 1214, the gesture-sensing system 500 determines whether the driver's hand detected at 1102 is in an "increase value" region of the steering wheel (or proximate thereto). If the hand is within the increase value region (e.g., second region 1052 of the function configuration mapping of FIG. 10C), the method 1200 proceeds to step 1218, otherwise it proceeds to step 1216.

At 1216, the gesture-sensing system 500 determines whether the driver's hand detected at 1102 is in a "decrease value" region of the steering wheel (or proximate thereto). If the hand is within the decrease value region (e.g., first region 1050 of the function configuration mapping of FIG. 10C), the method 1200 proceeds to step 1220, otherwise it returns to step 1102 to receive the next frame.

At 1218, the value of the setting is increased. As described above, the setting continue to be increased in value as long as the driver's hand continues to select the increase value function, at a predetermined rate of increase. Some settings may have a discrete set of values, whereas other settings may have a range of continuous values. Increasing a value may mean an upward or forward change, or a forward cycling through a sequence of values or options. After 1218, the method 1200 returns to step 1102 to receive the next frame.

At 1220, the value of the setting is decreased. As described above, the setting continue to be decreased in value as long as the driver's hand continues to select the decrease value function, at a predetermined rate of decrease. Some settings may have a discrete set of values, whereas other settings may have a range of continuous values. Decreasing a value may mean a downward or backward change, or a backward cycling through a sequence of values or options. After 1220, the method 1200 returns to step 1102 to receive the next frame.

At 1230, gesture-controlled device 100 determines whether the driver's hand is performing a wake-up gesture (e.g., L-shape gesture 302). If the hand is determined to be performing a wake-up gesture, the method proceeds to step 1224, otherwise it returns to step 1102 to receive the next frame.

At 1224, the voice command recognition system 570 is used to recognize a voice command based on the audio data 506 (e.g., using the speech recognition subsystem 572). If a voice command 508 is recognized, a corresponding function of the gesture-controlled device 100 is executed (not shown). In particular, at step 1226, if the voice command 508 is determined to be a command to enter a setting adjustment state (e.g., a voice command selecting an "adjust A/V playback position" function or an "adjust HVAC fan speed position" function), then the respective setting adjustment state is entered at step 1228., after which the method returns to step 1102 to receive the next frame. Step 1224 may include waiting for a predetermined duration of time (e.g., a speech command timeout duration, which may be based on a setting of the gesture-controlled device 100) to receive and recognize a voice command before timing out and returning to step 1102 to receive the next frame. While waiting for a voice command, the gesture-controlled device 100 may suspend processing of video frames in some embodiments.

Thus, method 1220 combines voice commands with a wake-up hand gesture and selection of steering wheel regions mapped to functions to execute any of a wide array of functions based on only a few distinct user commands that the driver must remember and distinguish. A previous frame must be processed to recognize a wake-up hand gesture being performed by the hand in the previous frame, before processing audio data to detect a function select voice command, thereby selecting a first setting from a plurality of settings based on the function select voice command. After that, hand-on-wheel gestures may be used to adjust the first setting value.

Figure 13:
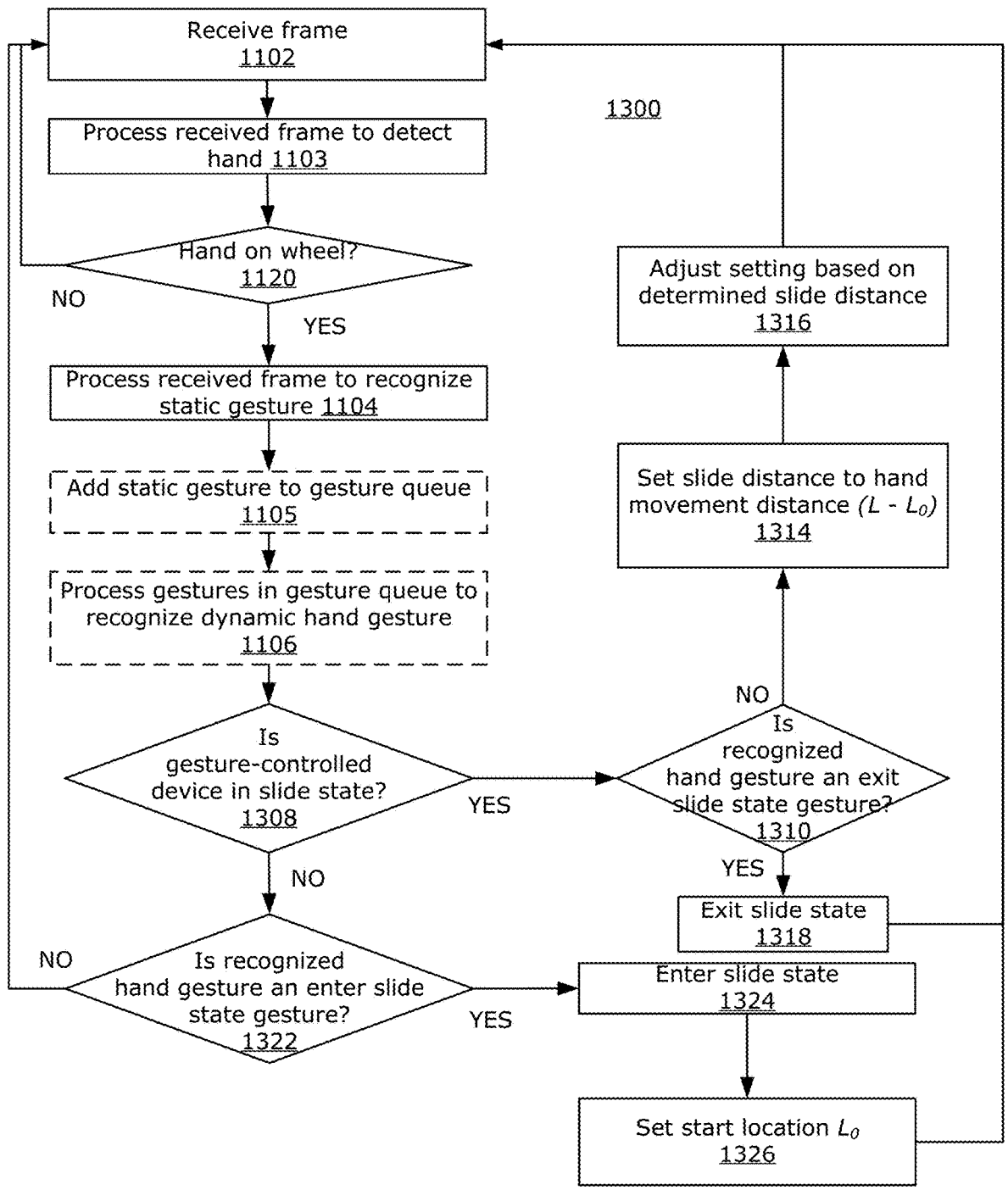
FIG. 13 is a flowchart illustrating a third example method for controlling the gesture-controlled device of FIG. 2 using hand-on-wheel gestures.

FIG. 13 shows a third example method for controlling the gesture-controlled device 100 using hand-on-wheel gestures. FIG. 13 maps a specific hand gesture to a specific setting; when that hand gesture is recognized, the setting value is adjusted based on a sliding movement of the hand performing the gesture.

Various steps in method 1300 are identified by the same reference numerals as steps of the method 1100 of FIG. 11. These steps of method 1300 operate identically or analogously to those steps, and will not be re-described.

Steps 1102 through 1006 proceed as in method 1100.

At 1308, the gesture-controlled device 100 determines whether it is in a slide state (as described above with reference to FIG. 8). If the gesture-controlled device 100 is determined to be in a slide state, the method 1300 proceeds to 1310, otherwise it proceeds to 1322.

At 1310, the gesture-sensing system 500 determines whether the gesture recognized at 1104 or 1108 is an exit slide state gesture. In some examples, the exit side state gesture may be a dynamic gesture transitioning from an L-shape gesture 302 performed on the steering wheel to any other gesture, or transitioning to a hand position off of the steering wheel. If the gesture is determined to be an exit slide state gesture, the method 1300 proceeds to 1318, otherwise it proceeds to 1314.

At 1314, a slide distance is calculated based on a previously stored starting hand location $L_0$ from a previous frame and the current hand location L (as determined at step 1103). The previous frame may be one of one or more frames previously processed to determine the hand location, e.g., at step 1103 of a previous iteration of the method 1300. The calculated slide distance may indicate both a direction and a magnitude of the movement from $L_0$ to L. For example, movement clockwise along the circumference of the steering wheel may be calculated as a positive distance (i.e. a positive, increased, upward, or forward direction), whereas counterclockwise movement may be calculated as a negative distance (i.e. a negative, decreased, downward, or backward direction). In some embodiments, the locations of the hand in one or more previous frames may be stored in a queue (e.g., in memory 208) and used to track the distance traveled during the slide state.

At 1316, the setting value is adjusted based on the slide distance determined at 1314. As described above, the magnitude and direction of the slide distance may be used to determine the magnitude and distance of the change to the setting value.

At 1318, the gesture-controlled device 100 exits the slide state, as described above with reference to FIG. 8. The method 1300 then returns to step 1102 to receive the next frame.

At 1322, as at step 1310, the gesture-sensing system 500 determines whether the gesture recognized at 1104 or 1108 is an enter slide state gesture. In some examples, the enter side state gesture may be a dynamic gesture transitioning from any gesture (or no recognized gesture) to an L-shape gesture 302 performed on the steering wheel. If so, the method proceeds to step 1324, otherwise it returns to step 1102 to receive the next frame.

At 1324, the gesture-controlled device 100 enters the slide state, as described above with reference to FIG. 8, and proceeds to step 1326.

At 1326, the starting hand location $L_0$ is set. The hand location may be stored in memory 208 or in a queue of previous hand locations from previous frames as described above.

Method 1300 thus enables a driver to perform a hand gesture mapped to a setting (such as audio volume) to perform the gesture on the steering wheel, then slide the gesture along the steering wheel to adjust the value of the setting.

Thus, in some embodiments, method 1300 may involve, first, recognizing a first hand gesture (e.g., the L-shape gesture) being performed by the hand in the frame, the first hand gesture corresponding to a first setting (e.g., audio volume) of a plurality of settings used by the gesture-controlled device (e.g., audio volume, HVAC fan speed, etc.). Second, the hand is determined to have been performing the first hand gesture in one or more previous frames (thereby indicating an ongoing slide). Third, a magnitude of a movement of the hand relative to the steering wheel is determined based on a starting location of the hand at a first location on the perimeter of the steering wheel in one of the previous frames (i.e. $L_0$) and a current location of the hand at a second location on the perimeter of the steering wheel in the frame (i.e. L). The gesture-controlled device 100 then executes a function which changes a value of the first setting (e.g., audio volume). The magnitude of change of the value by the function is based on a magnitude of the movement.

Figure 14:
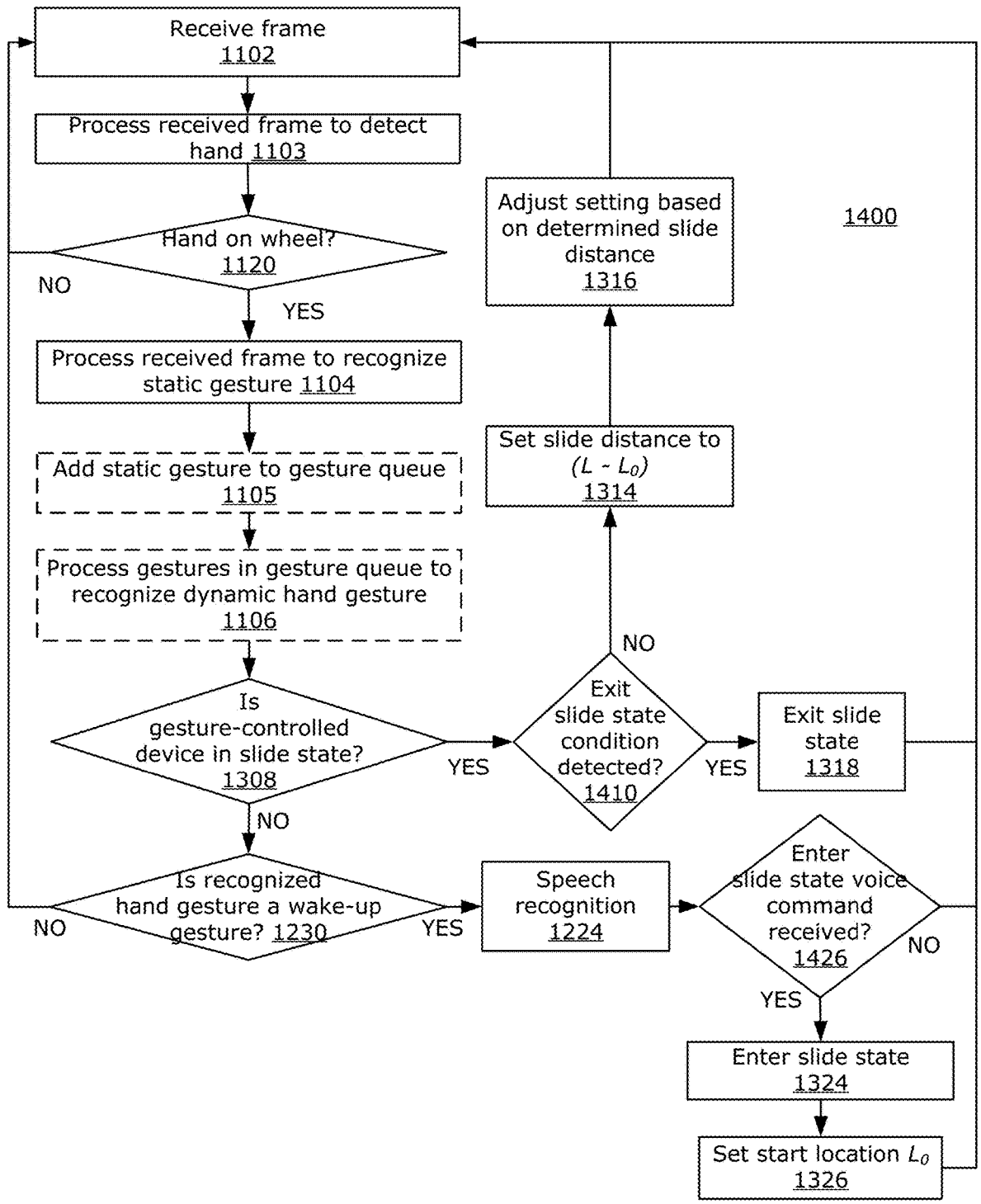
FIG. 14 is a flowchart illustrating a fourth example method for controlling the gesture-controlled device of FIG. 2 using hand-on-wheel gestures.

FIG. 14 shows a fourth example method for controlling the gesture-controlled device 100 using hand-on-wheel gestures. Method 1400 enables a driver to wake the gesture-controlled device 100 using a wake-up gesture (as in method 1200), then issue a voice command to select a function (as in method 1200), then perform a slide gesture along a segment of the steering wheel to adjust a setting value (as in method 1300).

Various steps in method 1400 are identified by the same reference numerals as steps of the method 1100 of FIG. 11, method 1200 of FIG. 12, or method 1300 of FIG. 13. These steps of method 1400 operate identically or analogously to those steps, and will not be re-described.

The only new steps added in method 1400 are steps 1410 and 1426. At 1410, because a specific gesture may not be specifically used as a slide gesture, some other condition may cause the gesture-controlled device 100 to exit the slide state. For example, in some embodiments a specific gesture (such as a select gesture 304) may be used as a generic slide gesture or all settings, and the slide state is exited at 1318 after the gesture-sensing system 500 determines at 1410 that the generic slide gesture is not being performed in the frame. In other embodiments, other conditions may trigger the end of the slide state, such the gesture-sensing system 500 determining at 1410 that the hand has been taken off the steering wheel, or one of the session end events described above.

At 1426, the voice command recognition system 570 determines whether a voice command 508 has been recognized that maps to a function causing the gesture-controlled device 100 to enter a slide state to enable the adjustment of a setting value. If such a voice command 508 has been recognized, the method 1400 proceeds to 1324; otherwise, it returns to 1102 to receive the next frame.

Thus, in some embodiments, before a setting value can be adjusted using a slide gesture, a previous frame must be processed to recognize a wake-up hand gesture being performed by the hand in the previous frame, and audio data must be processed to detect a function select voice command, resulting in the selection of a first setting from a plurality of settings based on the function select voice command.

It will be appreciated that method 1100, 1200, 1300, and 1400 are provided merely as examples of how hand-on-wheel gestures may be used, alone or in combination with voice commands, to provide complex driver input to control vehicle systems, and that other combinations of these elements may also be used and fall within the scope of the present disclosure. For example, a variant of method 1100 may be used to first select a first setting from a plurality of settings based on the location of the hand relative to the steering wheel (e.g., select one of the functions using the function mapping configuration of FIG. 10A), followed by performing a slide gesture along the selected region (i.e. circumferential segment) of the steering wheel to adjust a setting value. Thus, for example, a driver may first perform an encircle gesture 304 on the third segment 1006, thereby placing the gesture-controlled device 100 into an "adjust A/V content playback position" state, after which the driver's hand may remain in the encircle gesture 304 within the third region 1006, sliding the hand clockwise the advance the playback position or counterclockwise to reverse it. In another example, method 1200 may be modified to exit the setting adjustment state at step 1212 in response to recognizing a voice command and/or in response to a timeout, instead of or as an alternative to determining that the hand is in the 'exit' region at step 1210. In a further example, method 1400 may be modified to exit the slide state at step 1318 in response to recognizing a voice command and/or in response to a timeout, instead of or as an alternative to determining that the hand is performing an exit slide state gesture at step 1310. Other such combination of elements from previously described embodiments and examples are also possible.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for controlling a gesture-controlled device based on hand gestures, the method comprising:
processing at least one video frame to recognize a first hand gesture being performed by a hand in the at least one video frame;
processing audio data to detect a voice command;
in response to determining that the voice command was performed within a predetermined duration of time relative to the performance of the first hand gesture, processing a further video frame to determine:
a location of a steering wheel in the further video frame; and
a location of the hand relative to the steering wheel in the further video frame; and
executing a function of the gesture-controlled device, the function being selected from a plurality of functions based on the location of the hand relative to the steering wheel in the further video frame;
wherein:
the first gesture comprises a wake-up hand gesture; or
the voice command comprises a wake-up voice command.

2. The method of claim 1,
further comprising recognizing a second hand gesture being performed by the hand in the further video frame, wherein the function is selected based on the location of the hand relative to the steering wheel and the second hand gesture.

3. The method of claim 2, wherein determining a location of a hand relative to the steering wheel comprises determining that the location of the hand is within a first region of the steering wheel.

4. The method of claim 3, wherein the first region comprises a portion of a circumference of the steering wheel.

5. The method of claim 2,
further comprising determining a movement of the hand relative to the steering wheel based on the location of the hand relative to the steering wheel in the further video frame and a location of the hand relative to the steering wheel in one or more previous video frames,
wherein:
the function changes a value of a first setting used by the gesture-controlled device; and
the magnitude of change of the value by the function is based on a magnitude of the movement.

6. The method of claim 5, wherein the value may be changed in at least two directions, and the direction of the change of the value by the function is based on a direction of the movement.

7. The method of claim 6, wherein the direction and magnitude of the movement are determined based on:
a starting location of the hand at a first location on the perimeter of the steering wheel in at least one of the previous frames; and
a current location of the hand at a second location on the perimeter of the steering wheel in the further video frame.

8. The method of claim 1, wherein determining the location of the hand relative to the steering wheel comprises:
identifying a left hand and a right hand in the further video frame;
selecting the left hand or right hand as the hand used for gesture control based on a value of a primary hand setting; and
determining the location of the hand used for gesture control relative to the steering wheel.

9. The method of claim 5, further comprising, prior to executing the function, selecting the first setting from a plurality of settings based on the location of the hand relative to the steering wheel in a further at least one previous video frame corresponding to a time prior to the one or more previous video frames.

10. The method of claim 4,
wherein the first gesture comprises a wake-up hand gesture;
further comprising:
in response to recognizing the wake-up hand gesture, displaying visual feedback indicating a plurality of functions corresponding to a plurality of portions of the circumference of the steering wheel.

11. The method of claim 1, wherein:
the function changes a value of a first setting used by the gesture-controlled device; and
determining a location of a hand relative to the steering wheel comprises determining that the location of the hand is within a portion of a circumference of the steering wheel.

12. The method of claim 11, wherein:
the first gesture comprises a wake-up hand gesture;
the voice command comprises a function select voice command;

determining that the voice command was performed within a predetermined duration of time relative to the performance of the first hand gesture comprises determining that the voice command was performed within the predetermined duration of time after the performance of the first hand gesture; and the method further comprises:
selecting the first setting from a plurality of settings based on the function select voice command; and
presenting audio feedback identifying the first setting via an audio output device.

13. The method of claim 1, further comprising:
recognizing a first hand gesture being performed by the hand in the further video frame, the first hand gesture corresponding to a first setting of a plurality of settings used by the gesture-controlled device;
determining that the hand has been performing the first hand gesture in one or more previous frames; and
determining a magnitude of a movement of the hand relative to the steering wheel based on:
  a starting location of the hand at a first location on the perimeter of the steering wheel in at least one of the previous frames; and
  a current location of the hand at a second location on the perimeter of the steering wheel in the further video frame,
wherein:
  the function changes a value of the first setting; and
  the magnitude of change of the value by the function is based on a magnitude of the movement.

14. The method of claim 7, wherein:
the first gesture comprises a wake-up hand gesture;
the voice command comprises a function select voice command;
determining that the voice command was performed within a predetermined duration of time relative to the performance of the first hand gesture comprises determining that the voice command was performed within the predetermined duration of time after the performance of the first hand gesture; and
the method further comprises:
selecting the first setting from a plurality of settings based on the function select voice command; and
presenting audio feedback identifying the first setting via an audio output device.

15. A gesture-controlled device controlled by hand gestures, comprising:
a processor device; and
a memory storing machine-executable instructions thereon which, when executed by the processing device, cause the gesture-controlled device to:
  process at least one video frame to recognize a first hand gesture being performed by a hand in the at least one video frame;
  process audio data to detect a voice command;
  in response to determining that the voice command was performed within a predetermined duration of time relative to the performance of the first hand gesture, process a further video frame to determine:
    a location of a steering wheel in the further video frame; and
    a location of a hand relative to the steering wheel in the further video frame; and
  execute a function of the gesture-controlled device, the function being selected from a plurality of functions based on the location of the hand relative to the steering wheel in the further video frame;
wherein:
  the first gesture comprises a wake-up hand gesture; or
  the voice command comprises a wake-up voice command.

16. The gesture-controlled device of claim 15, further comprising a camera for capturing the further video frame.

17. The gesture-controlled device of claim 15, further comprising a display, wherein:
the first gesture comprises a wake-up hand gesture; and
the instructions, when executed by the processing device, further cause the system to:
  in response to recognizing the wake-up hand gesture, present visual feedback on the display indicating a plurality of functions corresponding to a plurality of portions of a circumference of the steering wheel.

18. A non-transitory processor-readable medium having machine-executable instructions stored thereon which, when executed by a processor device, cause the processor device to:
process at least one video frame to recognize a first hand gesture being performed by a hand in the at least one video frame;
process audio data to detect a voice command;
in response to determining that the voice command was performed within a predetermined duration of time relative to the performance of the first hand gesture, process a further video frame to determine:
  a location of a steering wheel in the further video frame; and
  a location of the hand relative to the steering wheel in the further video frame; and
executing a function of the gesture-controlled device, the function being selected from a plurality of functions based on the location of the hand relative to the steering wheel in the further video frame;
wherein:
  the first gesture comprises a wake-up hand gesture; or
  the voice command comprises a wake-up voice command.

19. The gesture-controlled device of claim 15, wherein:
the instructions, when executed by the processing device, further cause the gesture-controlled device to recognize a second hand gesture being performed by the hand in the further video frame; and
the function is selected based on the location of the hand relative to the steering wheel and the second hand gesture.

20. The gesture-controlled device of claim 19, wherein:
determining the location of a hand relative to the steering wheel comprises determining that the location of the hand is within a first region of the steering wheel.

* * * * *